United States Patent [19]

Klockenkemper et al.

[11] Patent Number: 5,659,976

[45] Date of Patent: Aug. 26, 1997

[54] AUTOMATED FABRICATION OF CORRUGATED PAPER PRODUCTS

[75] Inventors: Jerome J. Klockenkemper, Zionsville; Dennis M. Judge; Charles Douglas Moore, both of Indianapolis, all of Ind.

[73] Assignee: Inland Paperboard and Packaging, Inc., Indianapolis, Ind.

[21] Appl. No.: 521,714

[22] Filed: Aug. 31, 1995

Related U.S. Application Data

[63] Continuation-in-part of Ser. No. 432,038, May 1, 1995.

[51] Int. Cl.[6] .................................................. F26B 13/10
[52] U.S. Cl. .............................. 34/524; 34/114; 34/116; 156/64
[58] Field of Search ................................ 34/114, 116, 117; 156/64

[56] References Cited

U.S. PATENT DOCUMENTS

| | | | |
|---|---|---|---|
| 3,004,880 | 10/1961 | Lord | 156/64 |
| 3,981,758 | 9/1976 | Thayer et al. | 156/64 |
| 4,497,027 | 1/1985 | McGuire et al. | 364/471 |
| 4,947,559 | 8/1990 | Basler et al. | 34/70 |
| 5,244,518 | 9/1993 | Krayenhagen et al. | 156/64 |
| 5,527,408 | 6/1996 | Allen | 156/64 |

OTHER PUBLICATIONS

Werner, A. W., Chapter IX, "Corrugated Machinery," *The Manfacture of Fibre Boxes*, Ed. by Harry J. Bettendorf, 3rd Revised Edition, Jul., 1954, Board Products Publishing Co., Chicago, IL, Title page and pp. 67–88.

Primary Examiner—Henry A. Bennett
Assistant Examiner—Dinnatia Doster
Attorney, Agent, or Firm—Fitch, Even, Tabin & Flannery

[57] ABSTRACT

Method and equipment for the manufacture of corrugated paper products includes separate heaters for preparing liner and medium components. Data regarding these components is collected and an optimum conditioning for the components is determined. High voltage sensors, associated electronic circuitry and computer controls are used to determine surface moisture values.

9 Claims, 20 Drawing Sheets

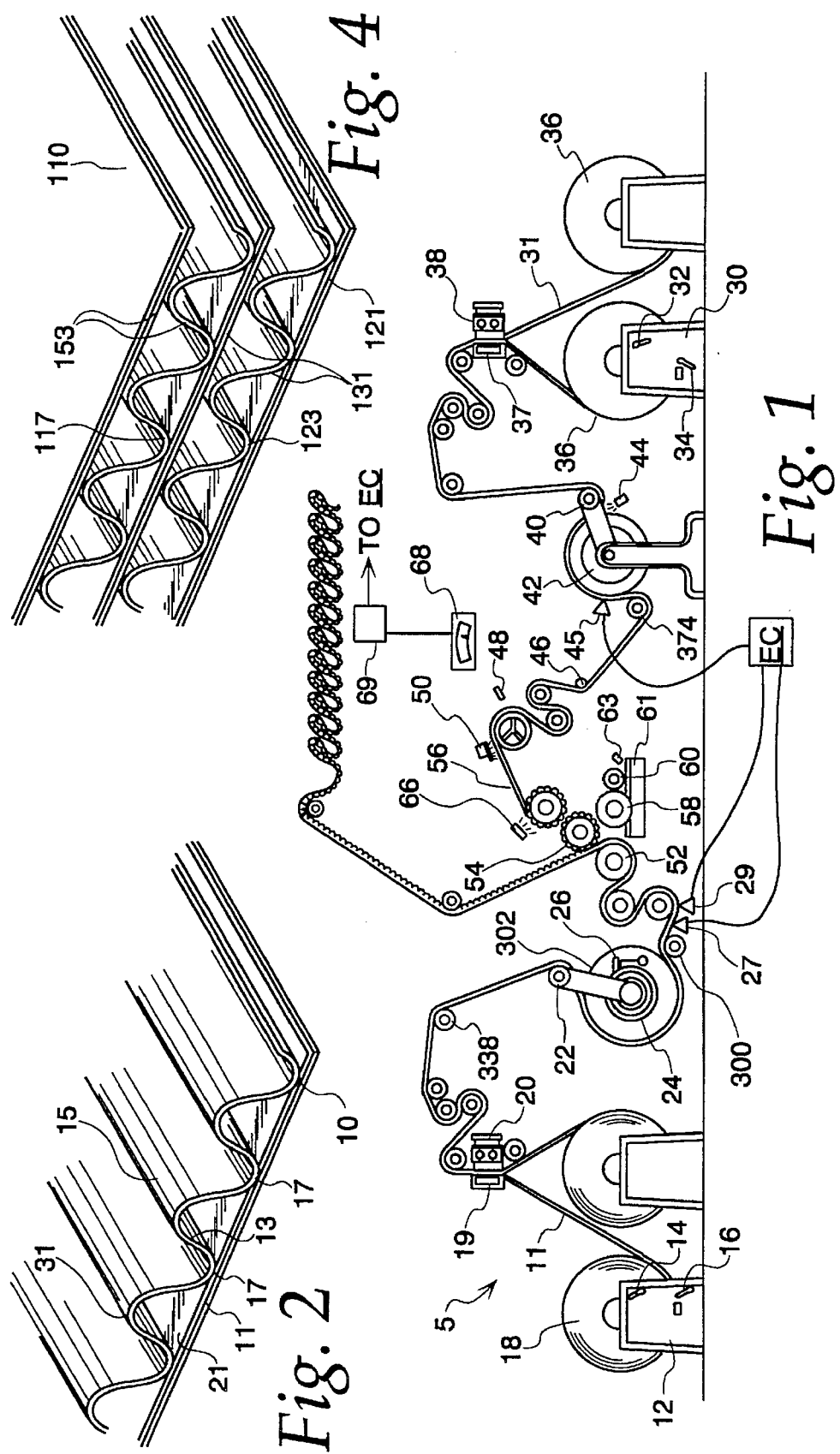

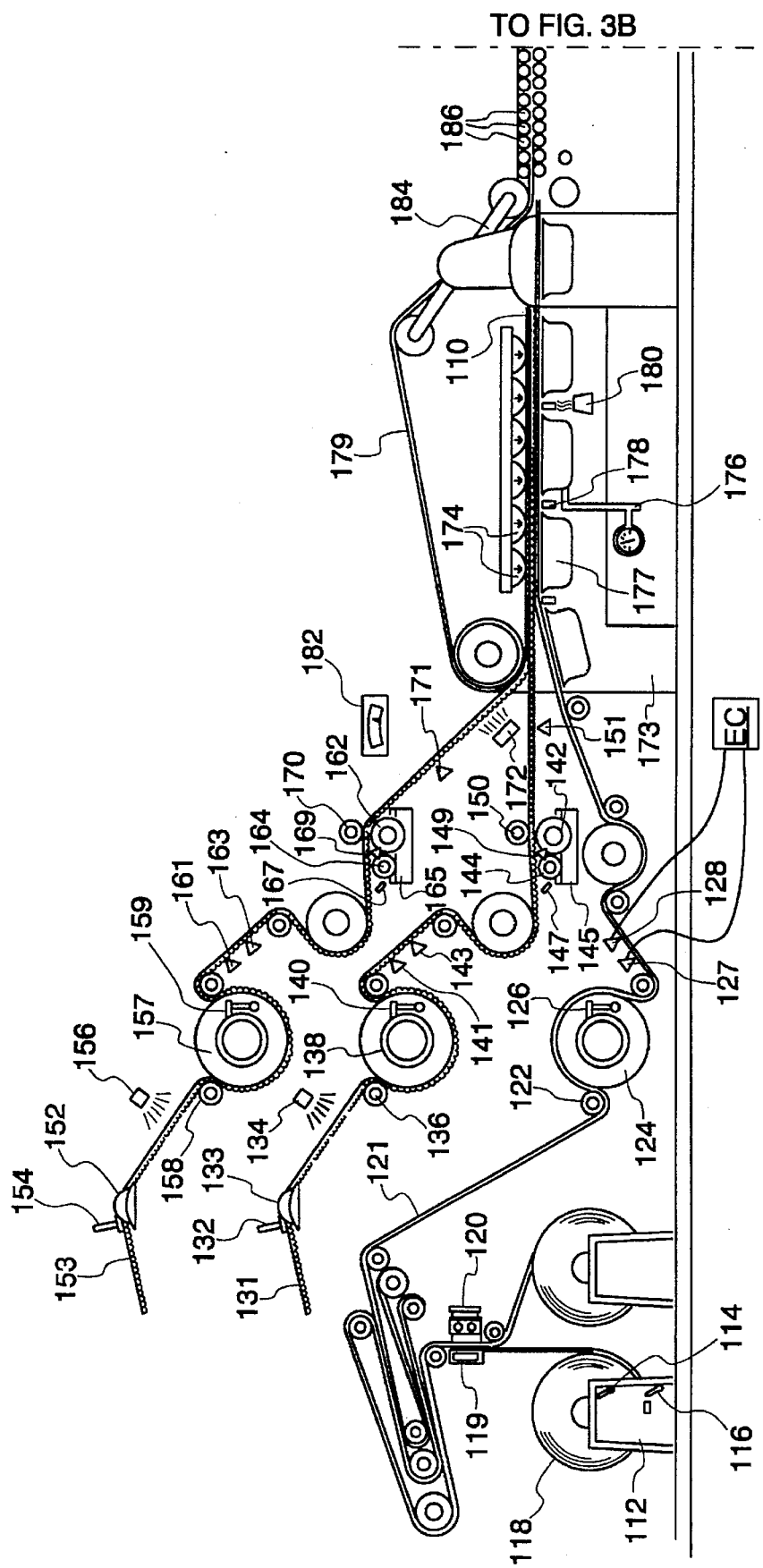

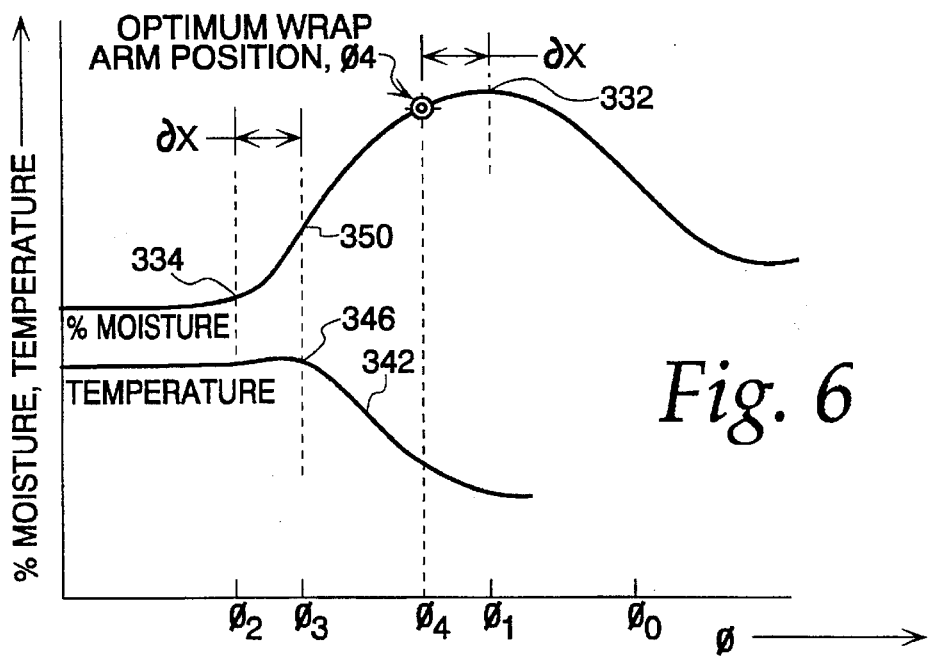
Fig. 6
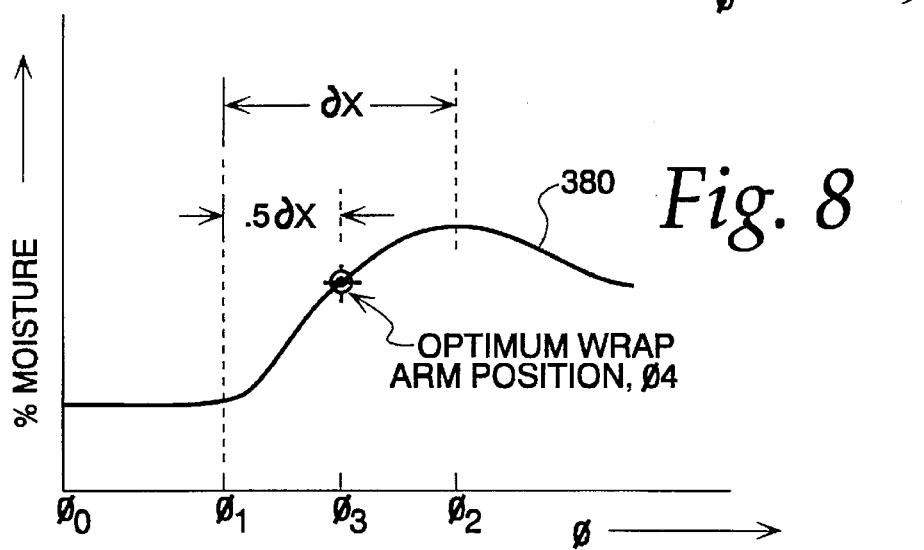
Fig. 8
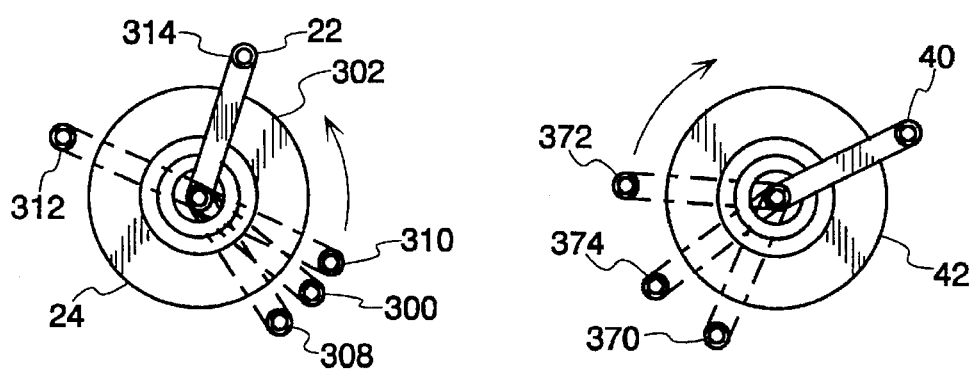
Fig. 5
Fig. 7

AUTOMATED FABRICATION OF CORRUGATED PAPER PRODUCTS

This is a continuation-in-part of U.S. patent application Ser. No. 08/432,038, filed May 1, 1995.

BACKGROUND OF THE INVENTION

1. Field of the Invention

This invention relates to the production of corrugated paperboard, and in particular to automated control based upon the moisture content of the paperboard components.

2. Description of Related Art

The measurement of moisture and the acquisition of moisture data is important in the manufacture of corrugated board such as that used where protection, separation, or support is required. A corrugated medium is typically formed in a machine which moistens or steams a paper web prior to passing it between two metal rollers cut with alternate flute tips and grooves which are geared to run in complement to each other. This impresses permanent parallel flutes in the paper perpendicularly to the machine direction. The flutes contribute significant rigidity and resistance to products which utilize the resulting corrugated medium.

After a corrugated medium is formed, it may be pasted or otherwise mounted to a liner to produce single-faced corrugated boards. If liners are joined to both sides of the corrugated material, a double-wall corrugated board results, and if double-faced and single-faced boards are joined together, a double-wall board results. Moisture data has been found to play an important part in controlling such mounting.

The economic impetus to produce corrugated board in mass quantities has led to the development of an in-line production process for single-faced, double-faced and double-wall corrugated board. The in-line production processes have several constituent steps, including specific steps for monitoring and adjusting the temperature and moisture contents of the paper webs employed.

The ability to accurately monitor and control the various constituent steps involved in the in-line processes can yield substantial economic benefits for the manufacturer and improve quality control. However, the many operational steps employed in a commercial process are interdependent, and any one constituent step may result in a variety of distinct undesirable qualities in the final product, and oftentimes it is difficult and time-consuming to isolate the root cause of a defect in the product based merely upon routine observation of the defect. Nevertheless, machine operators have been relied on to make adjustments to these types of machines in response to observations of identifiable defects or sets of defects, based on the operator's intuition or experience. Typically, adjustments to the machine are made in iterative steps. This, of course, results in waste of not only paper and adhesive, but also in lost production time.

It has been observed that perceived acceptable operating conditions lie within a fairly sizeable range of operating conditions, and a rapid determination of a narrower, more accurate operating range of conditions has been sought. The principal control steps for operating machines making corrugated paperboard focuses on the steps of preparing a liner for adhesive joinder, and a substantially different preparation of a paper web for formation into a corrugated medium. While the equipment for performing these different steps bears some similarity, it has been recognized that substantially different operating principles are needed if commercially acceptable products are to be made on a consistent, cost effective basis.

SUMMARY OF THE INVENTION

It is an object of the present invention to provide improved methods and apparatus for the acquisition of moisture content of paper liners used in the manufacturing of corrugated board.

Another object of the present invention is to provide improved methods and apparatus for the acquisition of moisture content of paper webs used in formation into a corrugated medium.

Another object of the present invention is to provide improved methods for adhesively joining a liner to a medium, and for the improved preparation of components prior to such joining.

Yet another object of the present invention is to provide improved controls for the automated manufacture of corrugated board controls for he automated manufacture of corrugated board comprising one or more liners and layers of paper medium, adhesively joined together.

These and other objects according to principles of the present invention are provided in a method for preparing a paper web for adhesive joinder, comprising the steps of:

providing a paper web having first and second opposed major surfaces and containing moisture;

providing heating means with a curved outer heated surface;

providing a wrap arm for wrapping the paper web across the heating means, with the wrap arm movable between first and second positions so as to bring greater and lesser portions of the paper web in contact with the heating means;

moving the wrap arm between said first and said second positions so as to bring a changing amount of the first surface of the paper web in contact with the heating means;

providing a probe means having electrically conductive probe elements for contacting the paper web at the first surface;

applying a voltage to the probe elements to create a test current flowing through the web;

sensing, for the different positions of the wrap arm, the surface moisture carried by the paper web at the first surface by measuring the test current;

sensing, for the different positions of the wrap arm, the temperature of the paper web at the first surface;

determining a low temperature wrap arm position at which a rate of increase of surface moisture increases;

determining a high temperature wrap arm position at which a rate of increase of surface temperature is negligible;

determining an offset comprising the difference between the low temperature wrap arm position and the high temperature wrap arm position;

determining a high moisture wrap arm position at which a rate of increase of surface moisture is negligible;

determining a desired operating position of the wrap arm by adjusting the high moisture wrap arm position toward the low temperature wrap arm position by an amount corresponding to the offset; and moving the wrap arm to the desired operating position.

Other objects according to principles of the present invention are provided in apparatus for preparing a paper web having first and second opposed major surfaces and containing moisture, for adhesive joinder, comprising:

heating means with a curved outer heated surface;

a wrap arm movable across the outer heated surface of the heater, for wrapping the paper web across the heating means;

means for moving the wrap arm between first and second positions so as to bring greater and lesser portions of the paper web in contact with the heating means;

temperature sensor means for sensing, for the different positions of the wrap arm, the temperature of the paper web at the first surface;

moisture sensor means for sensing, for the different positions of the wrap arm, the surface moisture carried by the paper web at the first surface, including a probe means having electrically conductive probe elements for contacting the paper web at the first surface and voltage means for applying a voltage to the probe elements to create a test current flowing through the web which is proportional to the surface moisture carried by the paper web at the first surface;

means for determining a low temperature wrap arm position at which a rate of increase of surface moisture increases;

means for determining a high temperature wrap arm position at which a rate of increase of surface temperature is negligible;

means for determining an offset comprising the difference between the low temperature wrap arm position and the high temperature wrap arm position;

means for determining a high moisture wrap arm position at which a rate of increase of surface moisture is negligible;

means for determining a desired operating position of the wrap arm by adjusting the high moisture wrap arm position toward the low temperature wrap arm position by an amount corresponding to the offset; and means for moving the wrap arm to the desired operating position.

Further objects according to principles of the present invention are provided in a method for preparing a paper web for corrugation, comprising the steps of:

providing a paper web having first and second opposed major surfaces and containing moisture;

providing heating means with a curved outer heated surface;

providing a wrap arm for wrapping the paper web across the heating means, with the wrap arm movable between maximum and minimum positions so as to bring greater and lesser portions of the paper web in contact with the heating means;

moving the wrap arm between a series of different positions, between said maximum and said minimum positions so as to bring a changing amount of the first surface of the paper web in contact with the heating means;

providing a probe means having electrically conductive probe elements for contacting the paper web at the first surface;

applying a voltage to the probe elements to create a test current flowing through the web;

sensing, for the different positions of the wrap arm, the surface moisture carried by the paper web at the first surface by measuring the test current;

determining a low moisture wrap arm position at which a rate of increase of moisture increases;

determining a high moisture wrap arm position at which a rate of increase of web moisture is negligible;

determining an offset comprising one-half of the difference between the low moisture wrap arm position and the high moisture wrap arm position;

determining a desired operating position of the wrap arm by adjusting the high moisture wrap arm position toward the low moisture wrap arm position by an amount corresponding to the offset; and moving the wrap arm to the desired operating position.

Still further objects of the present invention are provided in apparatus for preparing a paper web having first and second opposed major surfaces and containing moisture, for corrugation, comprising:

heating means with a curved outer heated surface;

a wrap arm movable across the outer heated surface of the heater, for wrapping the paper web across the heating means;

means for moving the wrap arm between first and second positions so as to bring greater and lesser portions of the paper web in contact with the heating means;

moisture sensor means for sensing, for the different positions of the wrap arm, the surface moisture carried by the paper web at the first surface, including a probe means having electrically conductive probe elements for contacting the paper web at the first surface and voltage means for applying a voltage to the probe elements to create a test current flowing through the web which is proportional to the surface moisture carried by the paper web at the first surface;

means for determining a low moisture wrap arm position at which a rate of increase of web moisture increases;

means for determining a high moisture wrap arm position at which a rate of increase of web moisture is negligible;

means for determining an offset comprising one-half of the difference between the low moisture wrap arm position and the high moisture wrap arm position;

means for determining a desired operating position of the wrap arm by adjusting the high moisture wrap arm position toward the low moisture wrap arm position by an amount corresponding to the offset; and means for moving the wrap arm to the desired operating position.

Yet further objects according to principles of the present invention are provided in a method for determining the amount of surface moisture carried by a paper web, comprising the steps of:

providing a probe means having electrically conductive probe elements for contacting the paper web surface;

applying a voltage to the probe elements to create a test current flowing through the web; and measuring the test current to obtain a value proportional to the amount of surface moisture carried by a paper web.

A high-speed computer is employed for system control. The computer is in communication with a plurality of sensors which are placed in various relevant locations throughout the system. The sensors include moisture sensors, as called for above, thermometers, speed sensors, position sensors, buttons and similar devices. The sensors, and especially the moisture sensors, continuously relay information that the computer uses to evaluate the condition of the system. The computer then effects changes in the system, when necessary, through a number of actuators. Actuators may include wrap arm control, roller pressure, valves, lights, thermostats and the like.

The control system enables the implementation of corrective adjustments based upon objective, in-line criteria rather than upon a subjective evaluation of a finished product by an operator.

BRIEF DESCRIPTION OF THE DRAWINGS

FIG. 1 is a schematic side view of a machine for the manufacture of single-faced corrugated board in accordance with the process of the invention;

FIG. 2 is a perspective view of a single-faced corrugated board produced by apparatus in accordance with the invention;

FIGS. 3a and 3b show a schematic side view of a machine for the manufacture of double-wall corrugated board in accordance with the process of the invention;

FIG. 4 is a perspective view of a double-wall corrugated board produced by apparatus in accordance with the invention;

FIG. 5 is a schematic diagram of a heating means employed in the practice of the present invention;

FIG. 6 is a diagram indicating operation of the heating means of FIG. 5;

FIG. 7 is a schematic diagram of another heating means employed in the practice of the present invention;

FIG. 8 is a diagram indicating operation of the heating means of FIG. 7;

DETAILED DESCRIPTION OF THE PREFERRED EMBODIMENTS

Figure 3B:
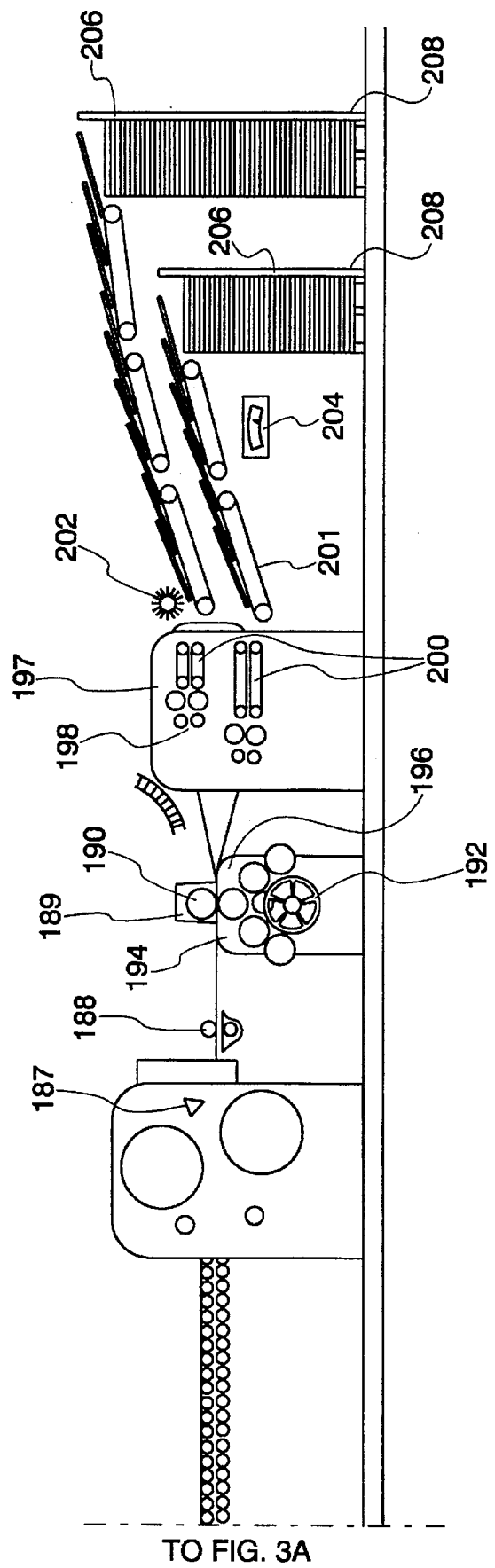

As will be seen herein, the present invention contemplates the manufacture of various paperboard products, including single-faced corrugated board as well as products such as double-faced corrugated board and double-wall corrugated board which employ a single-faced corrugated board as a component. It has been found advantageous in a manufacturing environment to employ a separate in-line manufacturing machine for producing single-faced board, and for providing separate automated in-line machinery for producing other corrugated boards, employing single-faced corrugated board as a component.

Single-Faced Board Manufacture

Turning now to FIGS. 1 and 2, an improved manufacturing apparatus 5 and related method is provided for the manufacture of single-faced corrugated board. The improvements are directed to the automated control of certain parameters of manufacture based on objective, substantially continuous sensor readings along in-line manufacturing apparatus. The in-line manufacturing apparatus 5 for manufacturing single-faced corrugated board includes roll stands 12 which retain rolled webs 18 of liner 11 for payout as the rolled webs 18 are rotated on the stand 12. One rolled web is employed at a time. The stand 12 has a skew adjustment 16 to properly align the liner 11 as it is spun off the web roll 18, and the stand 12 has a brake 14 to adjust the tension of the liner 11 as it is fed into a splicer 19. The splicer 19 also has a tension adjustment 20.

After passing through a series of rollers, including roller 338, the liner 11 is wrapped around the outer curved surface 302 of a substantially cylindrical preheater 24. The heat and pressure applied to the wrapped portion causes moisture from the interior of the liner 11 to move toward the surface of the liner. The amount of wrap, i.e., the angular extent of contact between the liner 11 and the outer, heated surface of preheater 24, is actuated by a preheater wrap arm 22 which moves across the outer preheater surface to adjust the amount or angle of contact. The preheater 24 also has a brake 26 to adjust the amount of tension in the liner 11.

As shown in FIG. 1, liner 11 is wrapped around the lower left part of preheater 24. If desired, liner 11 could also be wrapped around the upper right part of preheater 24, so as to treat the opposite major surface of liner 11. In this latter arrangement, liner 11 would pass over the left hand end of wrap arm 22, with counterclockwise movement of wrap arm 22 causing a greater amount of wrap. However, according to one aspect of the present invention, whichever surface of the liner contacts preheater 24, the surface of liner to be monitored for calculation of an optimum wrap arm position is the surface at which an adhesive bond is to be formed.

Figure 23:
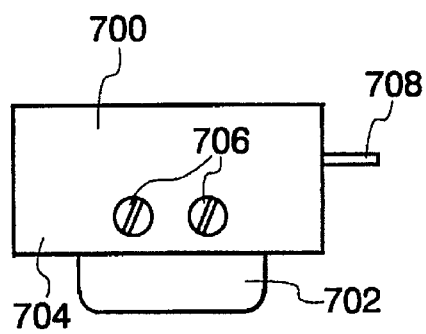
FIG. 23 is a front elevational view of a moisture probe according to principles of the present invention.
Figure 24:
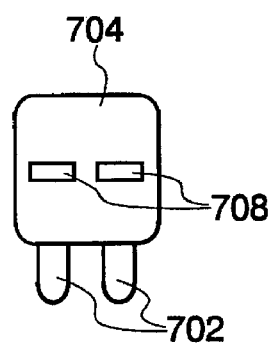
FIG. 24 is a side elevational view thereof.
Figure 25:
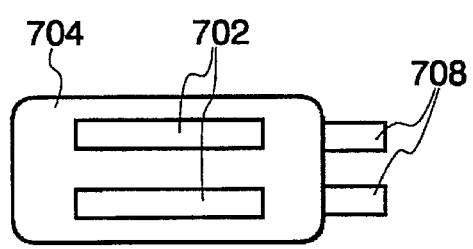
FIG. 25 is a bottom plan view thereof.

After being wrapped, the liner passes a surface moisture sensor 27 to measure the surface moisture on the liner 11 and to relay a continuous data stream through conductors to an electronic controller EC. FIGS. 23–25 show the preferred moisture probe or moisture sensor 700. A pair of metallic blade-like probe elements 702 are mounted within a dielectric body 704 by mounting screw 706. High voltage signals are fed to the terminals 708 of sensor 700, under control of the electronic controller EC. The sensor 700 is pressed against a traveling paper web. With reference to 23, the paper web would preferably move either to the left or to the right in the Figure. A high voltage signal is impressed across the probe element 702, causing current to flow through the paper web bridging the element 702. As will be seen herein, this current is acquired and measured in an electronic circuit, under control of the electronic controller EC. Any number of conventional arrangements can be employed to maintain continuous contact between the probe elements 702 and the moving paper web to ensure the integrity of data acquired.

The data acquired is indicative of the surface moisture content of the traveling web. For a given direct current high voltage applied to terminal 708, current between the elements 702 will increase with increasing surface moisture in the traveling web. Conversely, for a given direct current high voltage, current between the elements 702 will decrease for decreasing surface moisture in the traveling web passing across the sensor elements.

Figure 27:
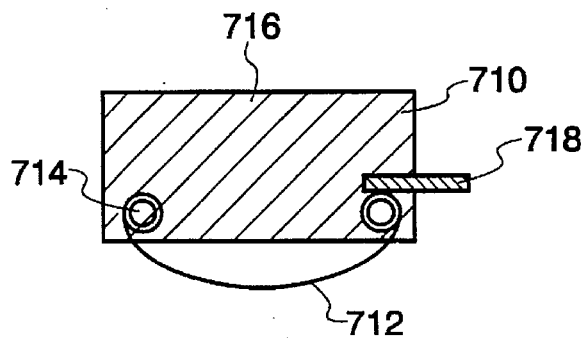
FIG. 27 is a cross-sectional view taken along the line 27—27 of FIG. 26.
Figure 26:
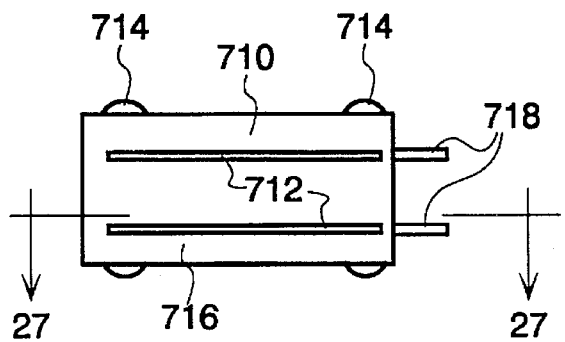
FIG. 26 is a bottom plan view of an alternative moisture probe.

Referring to FIGS. 26 and 27, an alternative probe or sensor 710 is illustrated. Sensor 710 employs a pair of spring wires 712 having looped ends mounted to mounting screws 714. These screws are in turn mounted within a dielectric body 716 and terminals 718 provide electrical connection to the wires 712. As can be seen in FIG. 27, the wires 712 are bent into a continuously rounded or arcuate shape. Preferably, the wires are made from a metal or metal alloy exhibiting resilient characteristics which help to maintain continuous engagement with a paper web traveling underneath the wires 712. The wires 712 could be replaced by bands of resilient metal having elongated cross sections, if desired. If the sensors are used to detect moisture in relatively abrasive media, the solid elements of sensors 700 are generally preferred.

In order to properly form the single-faced corrugated board (and corrugated products employing this board), it is critical that there be neither too much nor too little moisture on the surface of the liner 11. In addition to warping, improper levels of moisture may also contribute to poor subsequent adhesion between the liner and a corrugated medium 31. Shortly after passing the moisture sensor 27, the liner 11 passes a temperature sensor 29 which also relays information to the electronic controller EC. The liner 11 is then ready for mounting to corrugated medium.

As will be seen herein, a variable high voltage is applied to moisture sensor 27 as well as other surface moisture sensors employed herein, under control of the electronic controller EC. The voltage is preferably in the form of direct current signals ranging between 0 and 3000 volts, more preferably between 0 and 1500 volts, and most preferably at values centered around 1000 volts in normal operation. The high voltage signals applied to the moisture sensors are made variable, so as to accommodate a wide range of surface moisture values in webs being treated. For example, surface moisture values of webs being treated are expected to vary with seasonal changes, with varying storage conditions of the paper rolls and with different geographical locations of the production facilities.

The signals to the moisture sensors must be of a high enough voltage level to impress a current in the paper webs even if the surface of the webs is relatively dry. Also, the voltage signals applied to the moisture sensors are made variable so as to maintain test data within desired windows of operation, as will be seen herein. As mentioned, a direct current voltage signal is preferably applied to the moisture sensors. However, other types of voltage signals could also be employed, such as ultrasonic or radiofrequency alternating current waves.

The pre-corrugation steps for the preparation of paper web comprising medium 31 are to some extent similar to those for preparing the liner 11 for mounting. There is a rolled web 36 which rotates on a roll stand 30. A skew adjustment on the stand 30 keeps the medium 31 properly oriented and a brake 32 controls the tension in the medium 31. The medium is also run through a splicer 37 which has a tension adjustment 38.

The medium 31 is then wrapped around the outer surface of a substantially cylindrical preconditioner 42. Heat and pressure are applied to the wrapped portion of the medium to cause moisture within the medium to more evenly distribute throughout the thickness of the medium. If necessary, additional moisture can be added to the surface of the medium 31 at the beginning of the wrap by a preconditioning steamer 44. The amount of wrap, i.e., the angular extent of contact between the medium 31 and the heated outer surface of preconditioner 42 is actuated by a wrap arm 40 which moves across the outer surface of the preheater to adjust the amount of contact.

An interior or averaging type of moisture sensor 45 detects the moisture in the paper web 31 and sends a signal indicative of the moisture reading to electronic controller EC. In addition to warping, improper levels of moisture in a medium 31 may also contribute to improper shaping and size of the corrugated medium, and may also contribute to improper adhesion of the corrugated medium to liner 11, and other paper board that it may be combined with. Unlike the conditioning of the liner 11, which utilizes moisture value at the surface of the paper web, it has been found that better results are achieved at the medium preconditioner 42, if internal, average moisture values are measured.

Generally speaking, the medium 31 is wrapped around the upper part of preconditioner 42. However, if desired, medium 31 could be wrapped around the lower half of preconditioner 42, passing over the left hand side of wrap arm 40 shown in FIG. 1. While in many instances it may be preferred that the surface of medium 31 to be conditioned by contact with preconditioner 42 is that surface which later receives an adhesive coating, either surface of the preconditioned medium may be monitored, since it is the internal moisture value rather than the surface moisture value which is important.

The medium 31 then begins the corrugation process, passing a medium spreader bar 46, with an adjustment mechanism, to achieve a more uniform tension in the medium 31. The medium then passes through optional showers 48 and 50, and an oil mist applicator 66. The medium 31 winds around an upper corrugator roll 56, comprising an alternately ridged and grooved roller. The medium 31 passes between the upper corrugator roll 56 and a lower corrugator roll 54 which is also alternately ridged and grooved so that it generally rolls in complementary surface contact with the upper corrugator roll 56. As the medium 31 passes between the two rolls 54 and 56, the alternatingly ridged and grooved surfaces form the parallel flutes in the medium 31 (FIG. 2). The pressure of the surface contact between the two rolls is adjustable since inadequate pressure yields poor flute formation while excessive pressure may damage, or even completely sever, the medium 31. The corrugator rolls 54, 56 cooperate so as to impart a continuous wave shape which is visible, for example, in FIG. 2. If the paper web comprising medium 31 is not properly preconditioned, it is likely that medium 31 will not have the desired shape after passing through the corrugator rolls 54, 56. Further information concerning the proper preconditioning of the paper web comprising medium 31 will be given hereinafter.

As the medium 31 exits the corrugator rolls 54, 56, it passes through a nip between roll 54 and a glue roll 58. The glue roll applies an adhesive film, such as, but not limited to, a starch product, to one side of the corrugated medium 31, covering primarily only the flute tips on that side. Referring to FIG. 1, the corrugated medium 31, having inside and outside surfaces, 13 and 15 respectively, is glued at its inner tips 17 to the inside surface 21 of the liner 11 (i.e., that portion of corrugated web 31 in contact with liner 11, as can be seen in FIG. 2). The glue roll 58 is located in a glue pan 61 having a glue pan dam adjustment. Adhesive in the glue pan is carried by the glue roll 58 and is smoothed into a controlled film by a wiper roll 60 which forms a nip for the film with the glue roll 58. Along side the wiper roll 60 is a wiper blade 63 which has an adjustment mechanism to regulate the thickness of the film of adhesive.

The corrugated medium 31 and the liner 11 are then pulled together between the pressure roll 52 and the lower corrugator roll 54, where the adhesive-covered flutes of the corrugated medium 31 are pressed against the liner 11, bonding linearly along each flute. The operating speed of the manufacturing apparatus 5 is displayed by an operating speed indicator 68, which is coupled through a speed controller 69 to electronic controller EC. The speed controller 69 is coupled to the drives (not shown) for the corrugator rolls 54, 56 and pressure roll 52 to control the rates of speed of the webs passing through the manufacturing apparatus 5. The resultant product is single-faced corrugated board 10, as seen in FIG. 2, which may be used as such or incorporated into the manufacture of double-faced or double-wall corrugated board or other paper products.

Double-wall Corrugated Board Manufacture

Double-wall corrugated board, indicated at 110 in FIG. 4, is manufactured by mounting a top single-faced corrugated board 153 to a middle single-faced corrugated board 131 so that the tips 117 of the top board 153 adhere to the liner of the middle board 131. The middle board 131 is mounted, at its tips 123 to a liner 121. Thus, each liner is separated by a corrugated medium as shown in FIG. 4. Attention will now be directed to the double-backer assembly apparatus shown in FIGS. 3a, 3b.

As in the manufacture of single-faced board, there is a liner 121, spun from a web 118 which rotates on a roll stand 112 having a brake 114 and a skew adjustment 116. The skew adjustment 116 controls the orientation of the web 118 and the brake 114 adjusts the tension in the liner 121. Also affecting this tension is an adjustment mechanism 120 on the splicer 119.

The liner is wrapped around part of the perimeter of a substantially cylindrical preheater 124. The heat and pressure of the wrap causes some of the moisture in the liner 121 onto the surface of the liner 121. The amount of wrap, i.e., the angular extent of contact between the liner 121 and the preheater 124, is controlled by a preheater wrap arm 122 which moves to adjust the amount of contact. The preheater 124 also has a brake 126 to adjust the amount of tension in the liner 121.

After being wrapped, the liner 121 passes a moisture sensor 127 to measure the amount of surface moisture on the liner 121 and to relay accumulated data to the electronic controller EC through conductors (not shown). Moisture sensor 127 preferably comprises the moisture sensor 700 described above with reference to FIGS. 23–25 or may alternatively comprise the moisture sensor 710 described above with reference to FIGS. 26 and 27. Signals applied to the moisture sensor 127 are generally similar in nature to those applied to the moisture sensor 27, described above.

In order to properly form the double-faced corrugated board, it is critical that there be neither too much nor too little moisture on the surface of the liner 121. Shortly after passing the moisture sensor 127, the liner 121 passes a temperature sensor 128 which also relays information to the electronic controller EC through conductors (not shown). The liner 121 is then prepared for mounting.

As illustrated in FIG. 3a, double-wall board has, in addition to the liner 121, two pre-formed single-faced corrugated boards, 131 and 153, constructed as explained above with reference to FIGS. 1 and 2. The height and "pitch" of the flutes of the corrugated boards 131 and 153 need not be identical. For example, the flutes of one corrugated board could be higher or lower than the flutes of the other corrugated board. Further, it should be realized that the corrugated board 153 could be omitted, to form a double-faced board from the joinder of corrugated board 131 and liner 121.

The inner board 131 passes over a bridge guide unit 133 having a guide adjustment to control lateral displacement of the board 131 and a brake 132 to keep the single-faced board 131 in line with the liner 121 and to insure that a consistent amount of board 131 is drawn over a given time period. The board 131 then passes an optional water spray 134, which may be employed in some instances to help in reducing subsequent warp problems.

The board 131 is then wrapped around part of the perimeter of a substantially cylindrical preheater 138. The heat and pressure of the wrap forces some of the moisture in the board 131 onto its surface. The amount of wrap, as determined by the angular extent of contact between the board 131 and the substantially circular preheater 138, is actuated by a preheater wrap arm 136 which moves to adjust the amount of contact. The preheater 138 also has a brake 140 to adjust the amount of tension in the board 131.

After being wrapped, the board 131 passes a moisture sensor 141 to measure the amount of surface moisture on the board 131 and to relay accumulated data through wires (not shown) to the electronic controller EC.

In order to properly form the double-faced corrugated board, it is critical that there be neither too much nor too little moisture on the surface of the board 131. Shortly after passing the moisture sensor 141, the board 131 passes a temperature sensor 143 which also relays information to the electronic controller EC through wires (not shown). Preferably, the moisture sensor 141 is similar in construction and operation to the moisture sensors 27 and 127 described above.

The board 131 continues its in-line progression, passing through a surface contact point between a rider roll 150 and a glue roll 142. The glue roll 142 applies an adhesive film to the corrugated side of board 131, covering primarily only the flute tips on that side. Part of the glue roll 142 is submerged in adhesive which sits in a glue pan 145. The adhesive sticks to the glue roll 142 and is smoothed into a film by a wiper roll 144. Alongside the wiper roll 144 is a wiper blade 147. Optional sensors 149, 151 may be employed to double-check the moisture content or other physical properties of the intermediate product.

The outer board 153 passes over a bridge guide unit 152 having a guide adjustment to control lateral displacement of the board 153 and a brake 154 to keep the single-faced board 153 in line with the liner 121 and to insure that a consistent amount of board 153 is drawn. The board 153 then passes a water spray 156 designed to help in reducing subsequent warp problems.

The board 153 then is wrapped around part of the perimeter of an optional substantially cylindrical preheater 157. The amount of wrap, the angular extent of contact between the board 153 and the substantially circular preheater 157, is actuated by a preheater wrap arm 158 which moves across the preheated surface in the plane of the in-line process to adjust the amount of contact. The preheater 157 also has a brake 159 to adjust the amount of tension in the board 153.

After being wrapped, the board 153 passes a moisture sensor 161 to measure the amount of moisture and to relay accumulated data to the electronic controller EC. Shortly after passing the moisture sensor 161, the board 153 passes a temperature sensor 163 which also relays information to the electronic controller EC. Preferably, the moisture sensor 161 resembles the moisture sensor 127 described above, in construction and operation.

The board 153 then passes through a nip between a rider roll 170 and a glue roll 162. The glue roll 162 applies an adhesive film to the corrugated side of the board 153, covering primarily only the flute tips on that side. Part of the glue roll 162 is submerged in the adhesive which sits in a glue pan 165. The adhesive sticks to the glue roll 162 and is smoothed into a film by a wiper roll 164. Along side the wiper roll 164 is a wiper blade 167. After passing an optional steam shower 172, the outer board 153 is ready for mounting. Optional sensors 169, 171 may be employed to monitor physical properties of the intermediate product, if desired.

The liner 121, the inner single-faced corrugated board 131, and the outer single-faced corrugated board 153 are brought together along a machine 179 riding atop a hot plate table 173. The speed of the double-backer and the machine 179 are displayed by an operating speed indicator 182. The adhesive film on the corrugated side of the outer board 153 adheres to the liner side of the inner board 131 while the adhesive film on the corrugated side of the inner board 131 adheres to the liner 121. To strengthen the bonds and to form the double-wall corrugated board 110, pressure is applied by a series of hold-down devices 174 which exert force upon the board 110 as it passes. Simultaneously, the board 110 can be lifted by machine risers 178 enabling it to pass slightly above the hot plates 177 (which are energized by heat source 176) when operation of the manufacturing apparatus is temporarily halted.

In the preferred embodiment of the invention, there are fan blowers 180 for reducing warp in lighter classifications of board and for decreasing or eliminating the formation of brittle board. To avoid slippage of the machine, there is a machine tension adjustment 184 near the back of the hot plate table 174.

The board 110 is then driven across traction section rollers 186 until it passes a sensor 187 for detecting product. In the preferred embodiment, an anti-skid coating may then be applied by an anti-skid coating applicator 188 in order to meet the special needs of a particular use.

The board 110 subsequently encounters a slitter 189, having a slitter knife arrangement 190 with a lateral adjustment mechanism 192 which controls a horizontal score alignment 194 and a vertical score alignment 196. The board 110 is then pulled through a cutter 197 by knife feed rolls 198 which subsequently eject the freshly cut boards 110 through sandwich machines 200.

Finally, the cut boards 110 exit the cutter 197 onto an upwardly inclined downstacker machine 201, where, after being rolled under a snubber roll 202 while riding up the machine 201, they are stacked up against a substantially vertical backstop 206 emanating from downstacker rollers 208 beneath the stack. A machine speed adjustment 204 controls the rate at which the boards 110 are stacked.

Although double-wall products have been described, the present invention also contemplates manufacture of triple-wall and other multiple-wall products as well.

Preheater Control System

Referring now to FIGS. 5 and 6, operation of the preheater controls will be described in greater detail. FIG. 5 shows preheater 24 with wrap arm 22 located in a representative optimum running position. A stationary guide roller 300 guides web 11 leaving the preheater stage, on its way toward travel over pressure roller 52, in preparation for an adhesive joining operation. As mentioned above, wrap arm 22 is movable, being mounted for rotation about the outer surface 302 of preheater 24.

Outer surface 302, as mentioned, is preferably of a cylindrical shape, but may alternatively comprise virtually any curved shape as may be desired. In the preferred embodiment, wrap arm 22 is mounted for movement so as to be kept at a constant distance from outer surface 302, although this is not necessary. For example, outer surface 302 could, in cross section, have an arcuate shape which need not be circular. The wrap arm 22 would be mounted for movement across the outer surface with the distance between the wrap arm and the outer surface, generally speaking, not being critical, since the wrap arm functions as a "lead-in" point for guiding incoming web material.

In the preferred embodiment, wrap arm 22 is movable between a minimum (unwrapped) position 308 and a maximum (fully wrapped) position 310. In practice, it has not been found necessary to move the wrap arm 22 fully to the minimum position 308. Rather, it has been found sufficient to move the wrap arm 22 to a "park" position 312 indicated in FIG. 5. As indicated in FIG. 5, the representative, or typical optimum operating position 314 lies between the full wrap position 310 and the park position 312.

Determination of the optimum operating position 314 will now be described, with additional reference to FIG. 6. Initially, the wrap arm 22 is moved to the full wrap, maximum position 310 and data collection within the electronic controller EC is made ready. Moisture and temperature readings are then taken from sensors 27, 29, according to the preferred method to be described herein, as the wrap arm is moved from the maximum wrap position 310 to the minimum wrap or park position 312, and moisture and temperature data is stored for angular positions $\phi$ of the wrap arm 22.

Starting at the left hand end of FIG. 6, moisture data is collected at the full wrap position. As the wrap arm 22 is moved to the position, the moisture curve is generated toward the right hand end of FIG. 6. With continued movement of the wrap arm 22, moisture detected by sensor 27 (see FIG. 1) increases, passing through a "knee" in curve 331 identified by the reference numeral 334. With continued movement of wrap arm 22 toward the park position, the moisture curve rises to a maximum position 332 at which the rate of rise of moisture increase is negligible, i.e., passes through a zero slope point. With further movement of the wrap arm 22 toward the park position 312 (see FIG. 5), moisture level in the paper medium drops (see position $\phi_0$).

As the wrap arm travels toward point $\phi_1$ (corresponding to the negligible rate of increase point 332) from point $\phi_2$ (corresponding to data point 334), temperature data shown in FIG. 6 as curve 342 is collected. The point 346, the maximum point on curve 342, is noted at position $\phi_3$, corresponding to a negligible rate of increase of temperature in the paper web. The moisture value 350 corresponding to wrap arm position $\phi_3$ can be determined from curve 330.

The angular displacement $\delta_x$, that is, the difference between wrap arm positions $\phi_3$ and $\phi_2$ is calculated as an offset value. As mentioned above, wrap arm position $\phi_1$ is noted as the maximum moisture point. The offset $\delta_x$ is applied from angular position $\phi_1$ to arrive at the optimum wrap arm position $\phi_4$, and this is the angular position of wrap arm 22 indicated by reference numeral 314 in FIG. 5, and which also indicates the same position of wrap arm 22 illustrated in FIG. 2.

According to one aspect of the present invention, it has been found desirable to avoid operating the wrap arm at position $\phi_1$ since there is some risk, when operating in this mode, that moisture will be lost from the web (i.e., operation to the right of point 332 in FIG. 6). The operating point $\phi_4$, indicated as the optimum operating position in FIG. 6, closely corresponds to the high temperature dew-point on the flute side of liner 11 (that side bonded to the flutes of the corrugated medium). This high temperature dew-point attained according to principles of the present invention creates the maximum amount of heat and makes available the optimum amount of moisture on the flute side of the liner, enhancing the bond of the liner to the fluted medium.

As indicated above, it is important that the surface dew-point of liner 11 be chosen as the control target. When multiple liners (including liners of multiple single-faced board) are employed in a manufacturing process, the present invention automatically balances the moisture content of the various liner components at their highest surface temperatures, thus optimizing surface moisture level and surface temperatures, important for reliable, successful bonds using conventional corrugated manufacturing equipment. As will be appreciated by those skilled in the art, balancing of the moisture levels of liners (and other components) in a corrugated product greatly encourages and oftentimes is alone sufficient to ensure that a flat corrugated product will be produced. In effect, warpage of corrugated products can be eliminated automatically and production can continue in a routine manner without regard to imbalances of moisture levels in various liner components.

Preconditioner Control System

Turning now to FIGS. 7 and 8, operation of the preconditioner 42 will be described in greater detail. The wrap arm 40 is, in the preferred embodiment, mounted for rotation about the center of cylindrical preheater 42, between a maximum wrap position 370 and a minimum wrap position 372. The operating positions 370, 372 lie on either side of a stationary guide roller 374. In the preferred operation, wrap arm 40 is initially moved to the minimum wrap position 372 and data collection from sensor 45 is made ready.

As the wrap arm is moved from minimum position 372, to maximum position 370, moisture data is collected (see curve 380 in FIG. 8) according to the preferred method to be described herein. The minimum wrap position 372 corresponds to position $\phi_0$ in FIG. 8, and, as can be seen in FIG. 8, moisture values remain relatively constant until position $\phi_1$, when a rate of increase of moisture with wrap arm position begins. As wrap arm 40 is moved to the maximum wrap position 370, a negligible rate of increase of moisture is detected at a wrap arm position $\phi_2$. Thereafter, with increasing movement of wrap arm 40 toward the maximum position 370, a decrease in moisture in the web is detected (i.e., portion of curve 380 to the right of position $\phi_2$).

The angular displacement $\delta_x$ between wrap arm positions $\phi_1$ and $\phi_2$ is determined, along with the arithmetic mean, position $\phi_3$. The position $\phi_3$ is chosen as the optimum wrap arm position for operation of preconditioner 42. Unlike the operation of heater 24, which treats liner 11, the preconditioner 42 is concerned with the uniform distribution of moisture throughout the thickness of the medium 31. It has been found that by calculating position $\phi_3$ using the arithmetic mean of $\delta_x$, then an optimum result in web 31 is achieved, both for corrugation in the subsequent treatment of web 31, and also for bonding of the medium 31 to liner 11. The moisture sensor 45 may be any one of a number of commercially available moisture sensors which are employed to detect moisture values within a paper web, as opposed to moisture sensor 27, which can be any one of a number of commercially available moisture detectors for detecting surface moisture in paper web 11. Examples of preferred moisture sensors are given above with reference to FIGS. 23–27.

Preconditioning of medium 31 according to the above-described principles achieves a pliable, unbroken fluting of the medium, even after combining the medium with other components of a paperboard product. Treatment of the medium in accordance with the present invention results in expanded, swelled, soft and pliable fibers within and throughout the medium paper. This allows for better flute formation, with consistent control of flute height, better absortivity for the adhesive, resulting in stronger bonds at the flute tips, and also allows for proper setting of adhesive since an optimally preconditioned medium is provided. As a result, flute formation is improved along with better bonding at the flute tips, with enhanced overall production speeds and improved quality values.

Electronic Control—Preheater Control Operation

Figure 9A:
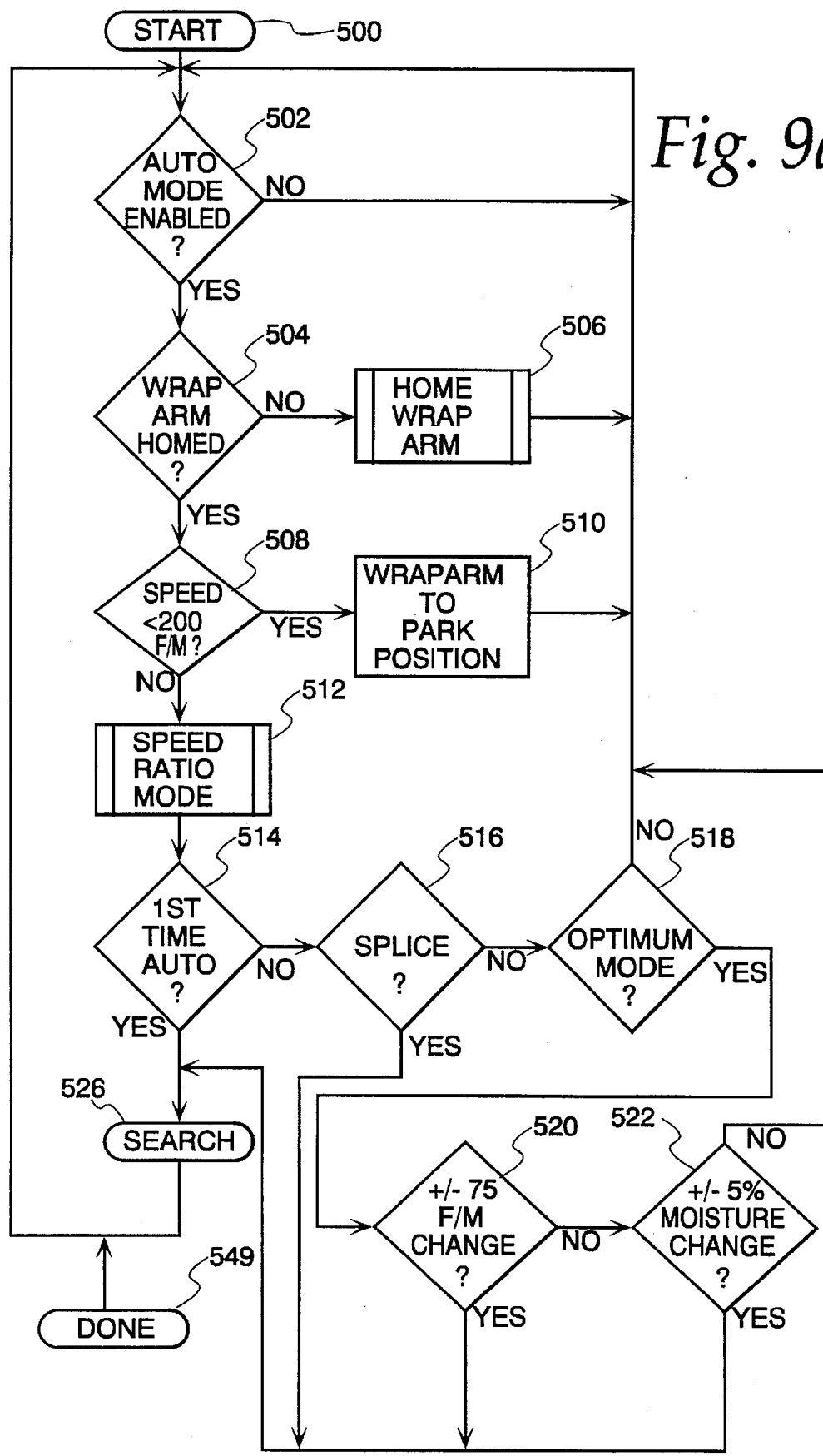
FIGS. 9a and 9b together show a flow chart indicating control of the heating means of FIG. 5.
Figure 9B:
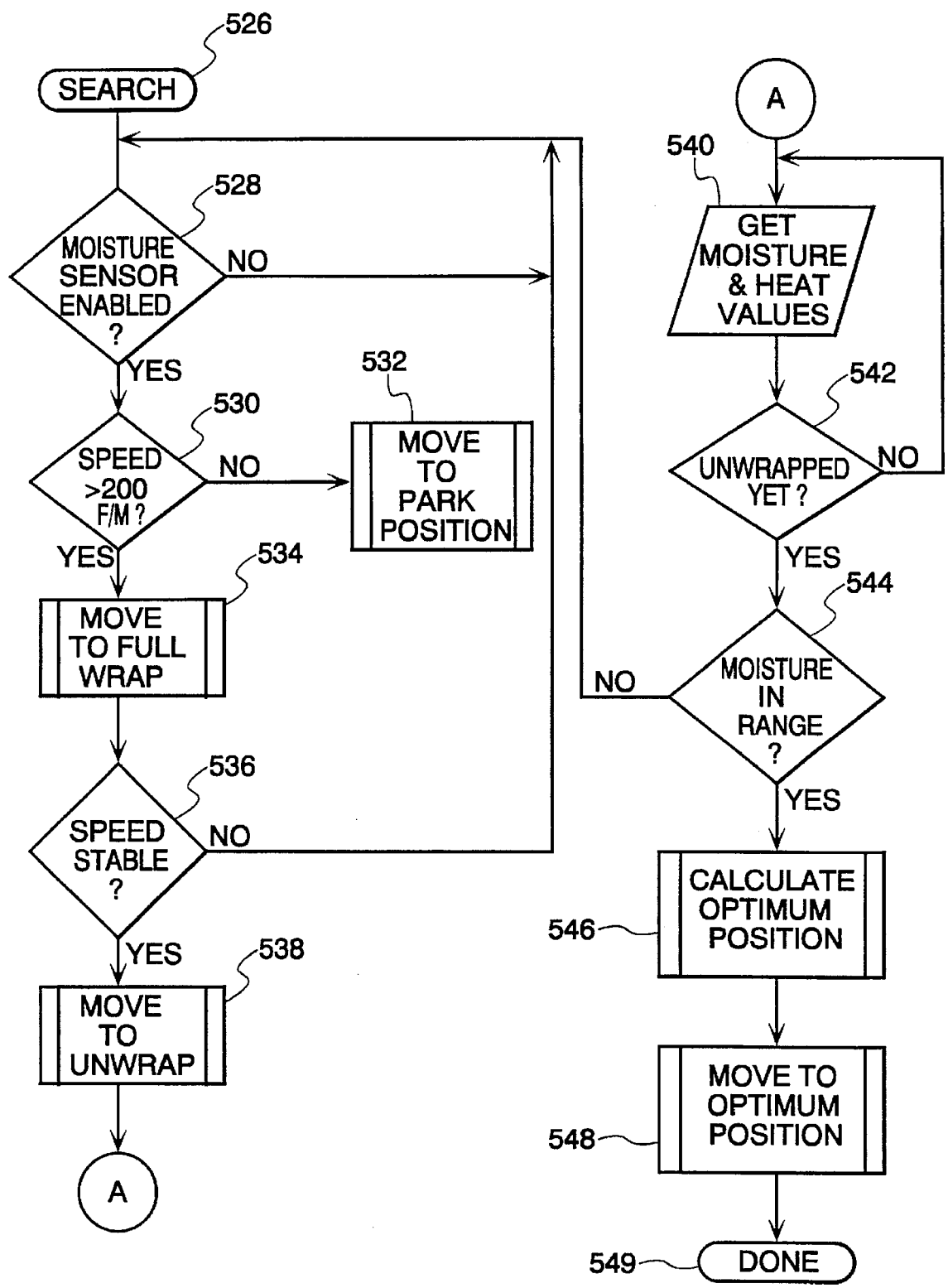

Turning now to FIGS. 9a, 9b, operation of manufacturing apparatus 5 will now be described. The flow diagram shown in FIGS. 9a, 9b pertains mostly to operation of preheater 24, under control of electronic controller EC, although the operating system also responds to web speeds indicated by speed indicator 68, under control of speed control circuit 69. Although there are several webs that can be accommodated by the present invention, it should be understood that reference to web speed here is concerned only with a liner, such as the liner 11 conditioned by heater 24. As mentioned, operation of manufacturing apparatus 5 is begun with loading the rolled webs 18, and threading the webs through the system, as illustrated in FIG. 2, for example. The heaters and optional showers are brought up to operating temperatures and pressures in preparation for a production run, indicated in FIG. 9a by block 500. Next, as indicated in decision element 502, query is made as to whether an automatic operating mode is enabled. Generally speaking, this contemplates two automatic control modes, the first focusing on the optimum positioning of wrap arm 22, and the second relating to adjustments in wrap arm position in direct proportion to the speed of web 11 past heater 24, as will be seen herein. If the automatic mode is not enabled, the electronic controller EC continues to poll the system to determine if the automatic mode has been updated.

With the automatic mode enabled, control is transferred to decision block 504 which tests whether the wrap arm 22 is homed to the maximum position 310 in FIG. 5. If necessary, block 506 energizes the drive system (not shown) for wrap arm 22 to move it to the desired angular position. Next, a test is conducted in decision block 508 to determine if a minimum critical web speed is maintained in the machine, and, if not, block 510 moves wrap arm 22 to park position 312 (see FIG. 5.

Control is then transferred to block 512, directed to a secondary control of manufacturing apparatus 5. Under control of block 512, the speed of web 11, controlled by control system 69 (see FIG. 1), is monitored for ongoing changes during system operation. The relation between web speed and desired wrap position is preferably proportional, i.e., the two values are directly related. Basically, control block 512 calls for greater wrap as web speed increases, and lesser wrap as web speed decreases. It should be recognized that the wrap arm 22 can be manually positioned by an operator with or without assistance from system instrumentation. A control block 512 would perform web speed-related adjustments to such manual wrap arm positioning if the auto mode is enabled (see block 502).

Control is then transferred to block 514 which tests whether the automatic mode was previously initiated. If not, a test is made in block 516 as to whether a splice has been made in web 11. If a splice has been made, the control system assumes that a recalibration is necessary. Control block 518 tests whether an optimum wrap arm operation has previously been achieved, and if not, control is transferred to the beginning of the control loop, at block 502.

If an optimum mode has been previously achieved, a test is made in block 520 as to whether the web speed has experienced an unacceptable perturbation, and if not, a test is made in block 522 to see whether an unacceptable perturbation in moisture has occurred. Block 520 tests whether a relatively small Change in web speed has occurred. If a change is below a preset threshold amount, then control block 512 is allowed to proceed with a ratio control of the wrap arm position, directly related to the web speed. If, however, block 520 detects an unacceptably large change in speed, then control block 512 is, in effect, relieved of further control, until a new operating point has been determined by a search routine indicated in block 526.

Referring now to FIG. 9b, a search initiated in block 526 transfers control to block 528 which tests whether the moisture sensor 27 is operational. Assuming the moisture sensor has been successfully verified, a test is made in block 520 to determine whether a minimum critical machine speed has been achieved, and if not, the wrap arm is moved to the park position 312 illustrated in FIG. 5. With a minimum critical machine speed verified, control is transferred to block 524 which begins a data collection cycle, moving the wrap arm 22 to the full wrap or maximum position 310 illustrated in FIG. 5. A test is made in block 536 to verify that web speed is sufficiently stable, that accurate test results will be obtained. Assuming such verification is obtained, control is then transferred to block 538 which moves wrap arm 22 from the maximum position 310 to the unwrapped or minimum position 308. As mentioned above, control of wrap arm 22 by control block 538 may, optionally, require the wrap arm to be moved to the park position 312 rather than to the fully wrapped minimum position 308.

In control block 540, heat and moisture data is collected as wrap arm 22 is moved throughout its operational range of motion, and a representative example of the data obtained in control block 540 is illustrated in FIG. 6. As indicated by block 542, data collection continues until the wrap arm 22 is moved to its end point (either park position 312 or a fully unwrapped minimum position 308). Block 544 tests whether the observed moisture values lie within a reasonable range, the physical interpretation of which is a quick pass-fail decision as to whether the paper is (for some unusual reason) too wet or too dry. Assuming the pass-fail test is performed with a favorable outcome, control is transferred to block 546 which calculates the optimum wrap arm position $\phi_4$, using the technique described above with reference to FIG. 6. The wrap arm is then moved by control block 548 to the optimum wrap arm position $\phi_4$. Block 549 then stores a value in memory indicating that optimum mode has been achieved and this data is eventually tested in decision block 518.

As indicated at the bottom of FIG. 9a, control is then transferred to the top of the automatic control procedure, with the test then being performed by decision block 502. As mentioned, the optimum wrap arm position has been achieved, and is subsequently adjusted, if necessary, in control block 512, in response to a change in web speed, using a "ratio" or direct mathematical relation between web speed and wrap arm position change. Decision block 514 will test false, requiring further testing in decision blocks 516–522 to be performed, thus monitoring as to whether unusual perturbations in web speed or moisture change have occurred since the wrap arm was set to an optimum position. If necessary, recalculation and determination of an updated optimum wrap arm position will be required, with control being transferred to block 526.

Moisture Sensing and Data Acquisition

As mentioned above, surface moisture is preferably detected by passing a high voltage direct current signal between probe elements contacting the surface of the traveling web. Referring to FIG. 22, an electronic circuit 730 will be seen to include major and minor control loops as well as providing an isolated drive circuit for the high voltage elements of the surface moisture sensors. The voltage applied to the moisture sensors is provided by high voltage power supply 720 having an output connected to a connector terminal HV appearing at the right hand of the Figure. Preferably, the high voltage source 720 comprises high voltage power supply Model SC15 available from AHV Commercial Division of Hannington International, located in Alpine, Calif. As will be seen herein, the signal applied to connector terminal HV CONTROL is identified as signal HV in FIGS. 11–21. The connector terminals HV and HV RETURN are coupled through appropriate electrical conductors to the terminals 708 of moisture sensor 700. This arrangement is preferred for the surface-sensing moisture sensors 27, 127, 141 and 161 described above.

The high voltage outputted by circuit 720 is controlled by the HV control signal applied to connector terminal HV CONTROL appearing at the right hand end of the Figure. This signal preferably ranges between 0 and 10 volts, and comprises the driving signal for a major control loop of the electronic circuitry generally indicated by the numeral 730. The HV input signal is applied to the positive input of operational amplifier 722 which in turn applies an input signal to device 724, preferably a commercial device type LM317. Device 724 in turn controls the high voltage power supply 720.

The voltage applied across the probe elements of the moisture sensor drives a high voltage test current which travels through the connector terminal HV RETURN appearing at the right hand end of FIG. 22. The test current signal then passes through a resistor 727 mounted in a dip socket 728. The high voltage test current signal continues through an optoisolator 732, preferably of a device type P2502-1. The output of optoisolator 732, an isolated test signal proportional to the high voltage test current, is applied through variable resistor 734 to the positive input of operational amplifier 736. The output of operational amplifier 736 is coupled through resistor 738 to summing node 740. Summing node 740 is in turn coupled through operational amplifier 742 to the connector terminal labeled ERROR SIGNAL OUT at the right hand end of FIG. 22. The resulting signal formed by the signal combination (herein the Error Signal ES) that appears at this connector terminal is identified as signal ES in FIGS. 11–21, as will be described herein.

Referring again to FIG. 22, a Level Shift signal LS is applied to the connector terminal labeled LEVEL SHIFT at the right hand end of FIG. 22. As will be seen herein, the signal LS is ramped and/or nonlinearly curved in an appropriate direction so as to null the signals combined at the summing node 740, thereby zeroing or nulling the Error Signal ES appearing at the connector terminal ERROR SIGNAL OUT. The Level Shift signal LS is applied to the negative input terminal of operational amplifier 746. The output of operational amplifier 746 is coupled through a resistor 748 to summing node 740. The Level Shift signal LS preferably ranges between 0 and 10 volts and is the input to the minor control loop portion of electronic circuit 730. The Error Signal ES appearing at connector terminal ERROR SIGNAL OUT preferably ranges between 0 to 10 volts and is most preferably held within a 0.2 volt band, as will be seen herein.

The remainder of electronic circuit 730 provides additional features not directly related to moisture sensing and moisture data acquisition. For example, a signal at summing node 730 is coupled through an operational amplifier 752 to a selector switch 754 which selectively routes the signal to a numeric display 756 to provide visual indication to a machine operator, or for use in diagnostic purposes, for example. Also, the output of optoisolator 732 is coupled through operational amplifier 758 to the selector switch 754 for display on numeric display 756.

Figure 11:
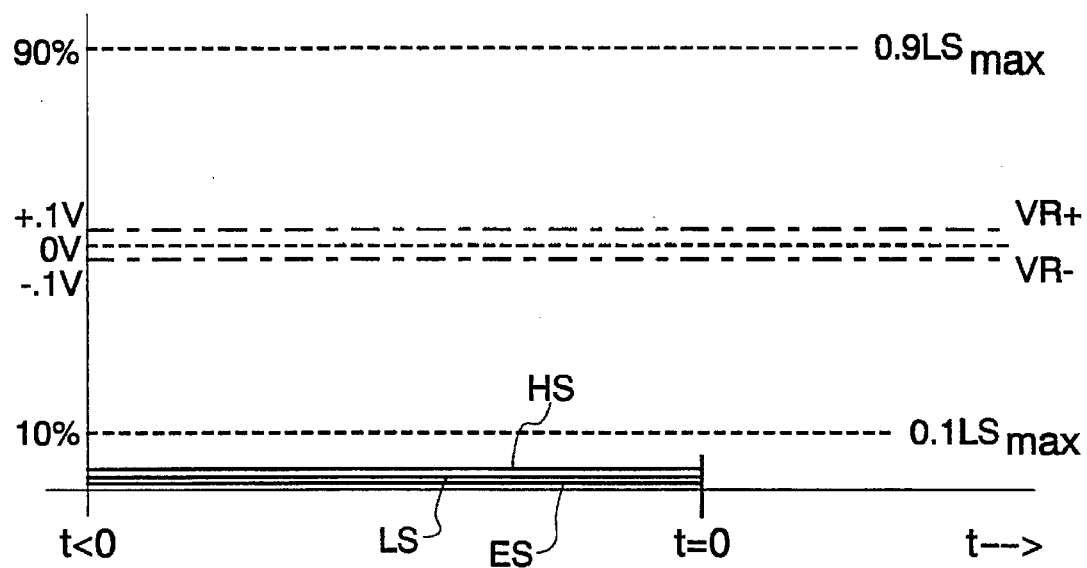
FIGS. 11–20 are diagrams showing moisture sensing and data acquisition.

Referring now to FIGS. 11–21, operation of the moisture sensing and data acquisition aspects of the present invention will be further described. Referring initially to FIG. 11, conditions prior to startup of electronic circuit 730 are indicated, with the input signals HV and LS at zero level, and with the output signal ES also at zero level. Several predefined values are indicated in FIG. 11. As will be seen herein, the electronic controller EC and electronic circuit 730 operate to maintain the output Error Signal ES within the 0.2 volt band lying between $VR^+$ and $VR^-$. That is, the Error Signal ES is preferably maintained within ±0.1 volt of a 0 volt or null level. The input signal LS is changed in order to maintain the Error Signal ES within the 0.2 volt band indicated in FIG. 11. The input signal LS drives a minor control loop which maintains the Error Signal ES within the desired band. However, if the input signal LS is unable to effectively control the Error Signal ES in this manner, the input signal HV drives a major control loop so as to drive the Error Signal directly while maintaining the Level Shift signal LS between 10% and 90% of its maximum values (which are indicated in FIG. 11).

Figure 12:
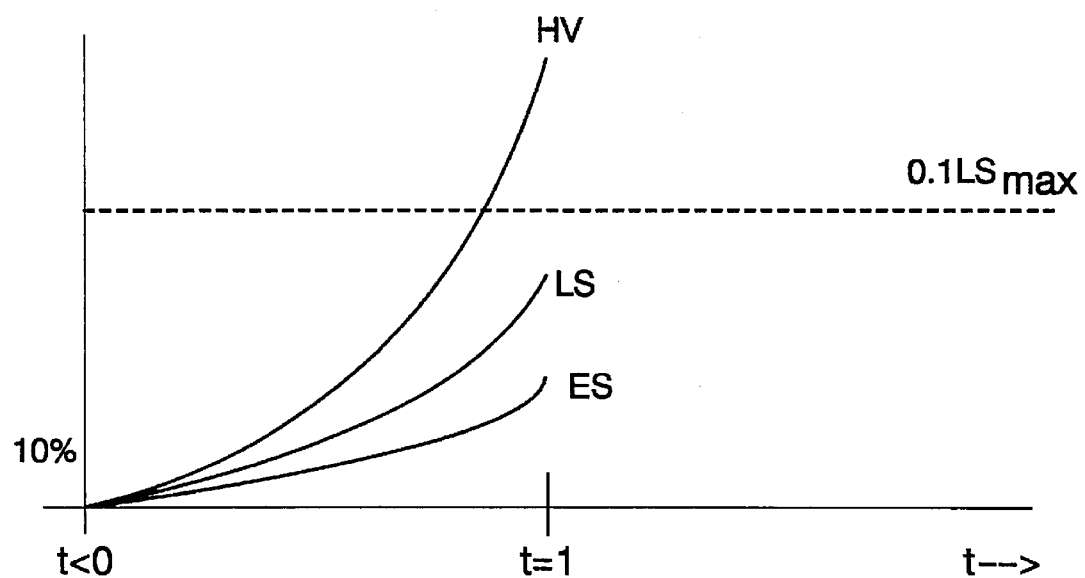
Figure 21:
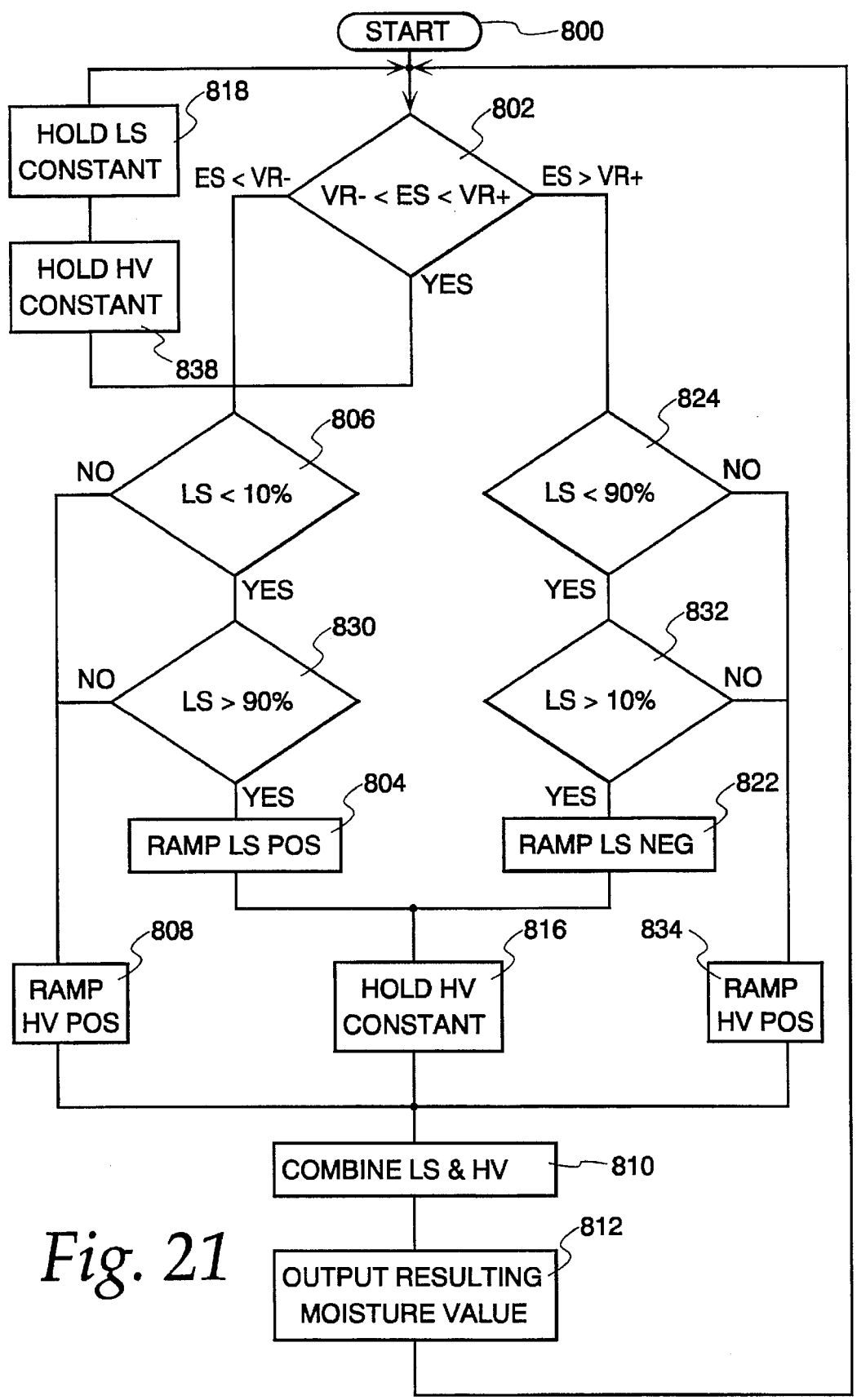
FIG. 21 is a flow diagram showing moisture sensing and data acquisition.
Figure 22A:
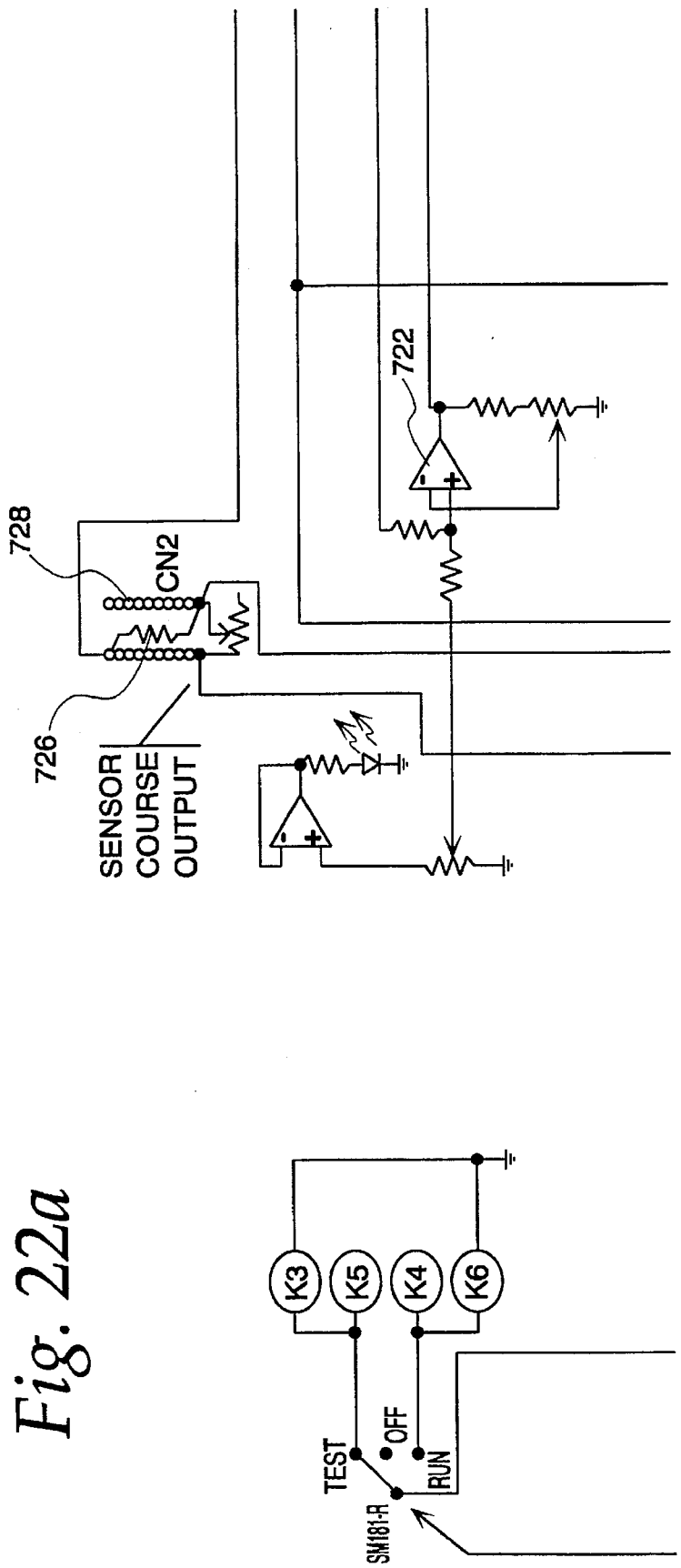
FIG. 22 is a schematic diagram of electronic circuitry used in the moisture sensing and data acquisition.
Figure 22B:
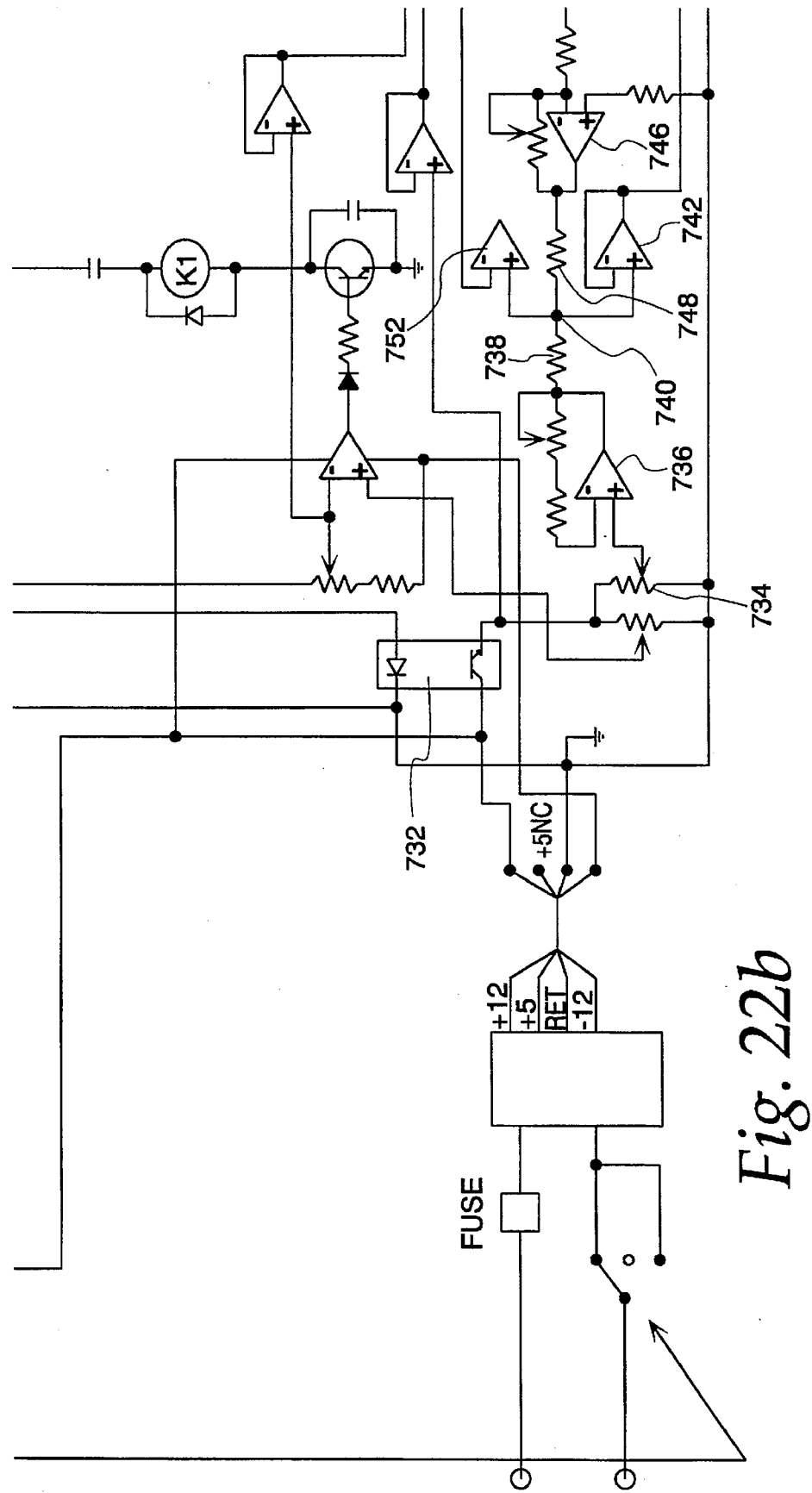
Figure 22C:
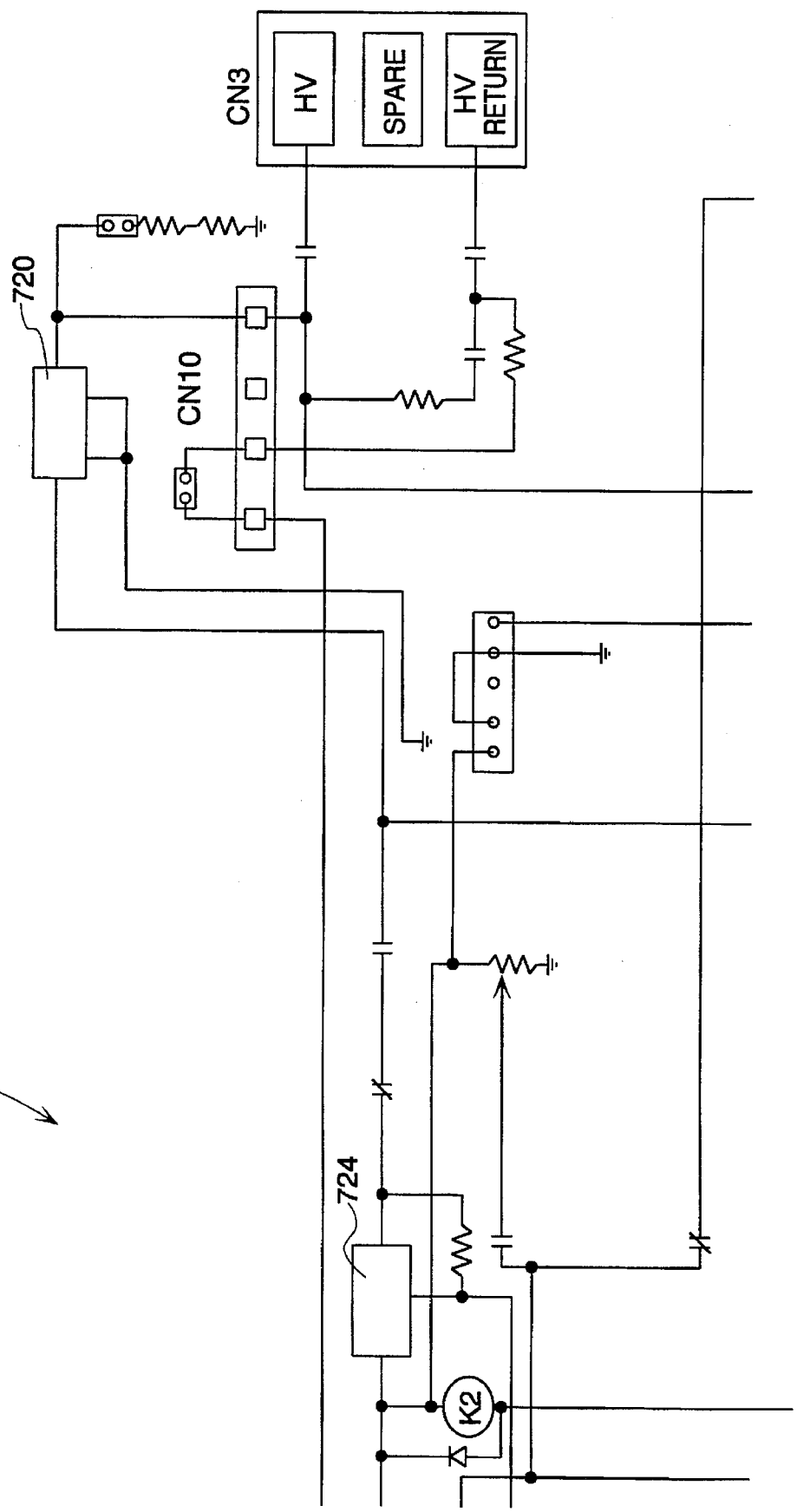
Figure 22D:
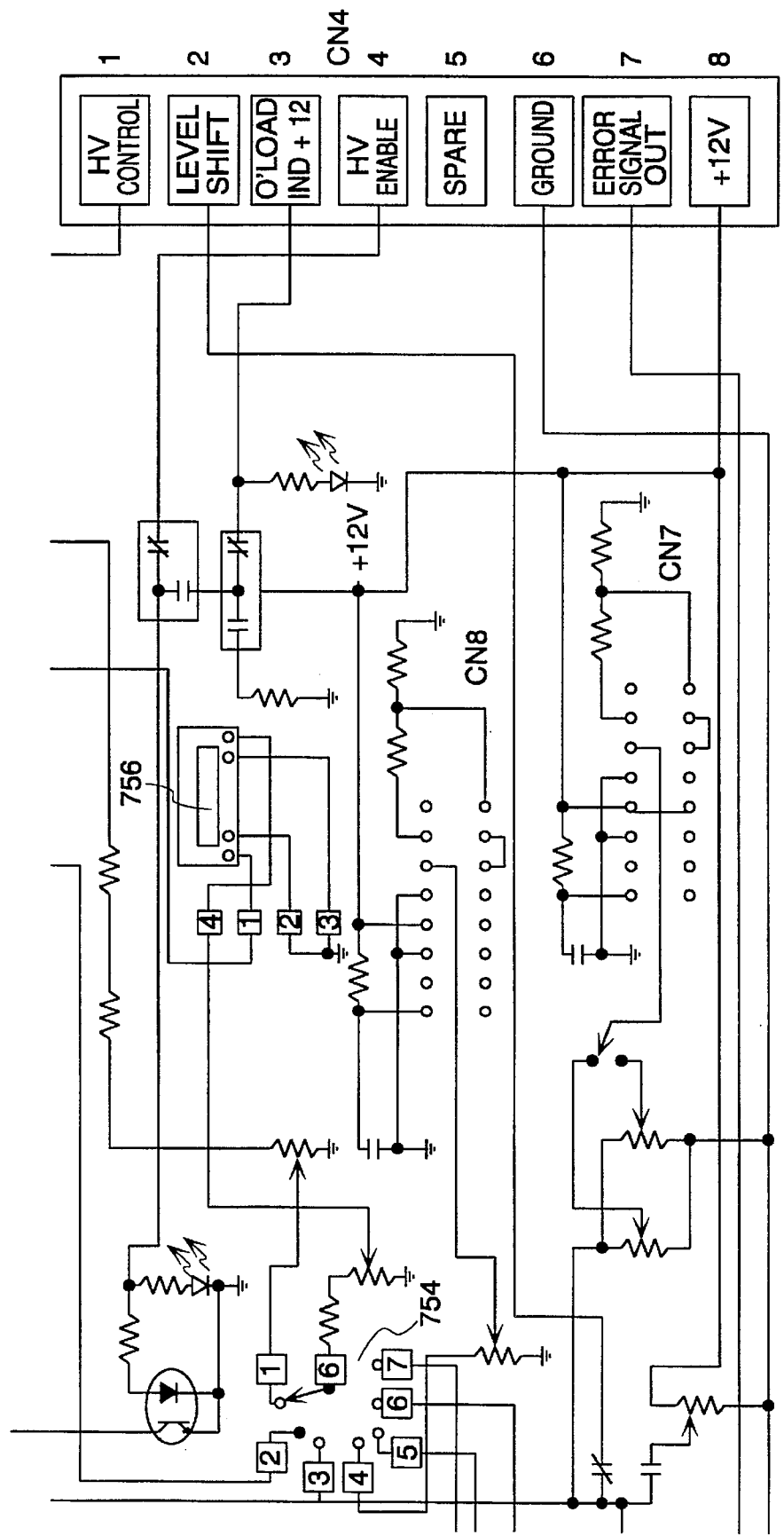

At time $t_0$ the equipment is energized, and the electronic controller EC begins the program steps indicated in the flow diagram of FIG. 21. The electronic controller starts at point 800 and proceeds to decision block 802 for an initial determination as to whether the output signal (error signal) ES lies within the desired band (between $VR^+$, set at a positive 0.1 volt, and $VR^-$, set at a negative 0.1 volt. These preset limits, as mentioned, are defined boundary values of the output signal ES. Referring to FIG. 12, the output signal ES lies below the desired operating band.

Since the error signal ES is less than $VR^-$, control is transferred to the left hand end of decision block 802, and passes to decision block 806, where the signal LS is tested to determine whether it exceeds 10% of its maximum value. As indicated in FIG. 12, this condition is not satisfied, and accordingly, the input signal HV applied to the input terminal HV CONTROL is ramped (or otherwise increased) in a positive direction, in response to control block 808 in FIG. 21. Control is then passed to block 810 which combines the input signals LS and HV. The method of combination preferably comprises taking the arithmetic mean of the LS and HV values at particular instants in time. However, other combination methods may also be employed, such as taking the geometric mean, or a weighted average. According to control block 812, the resulting moisture value is outputted, as indicated in blocks 540 (see FIG. 9b) or 640 (see FIG. 10b). Control then loops back to the start block 800 for another iteration.

Figure 13:
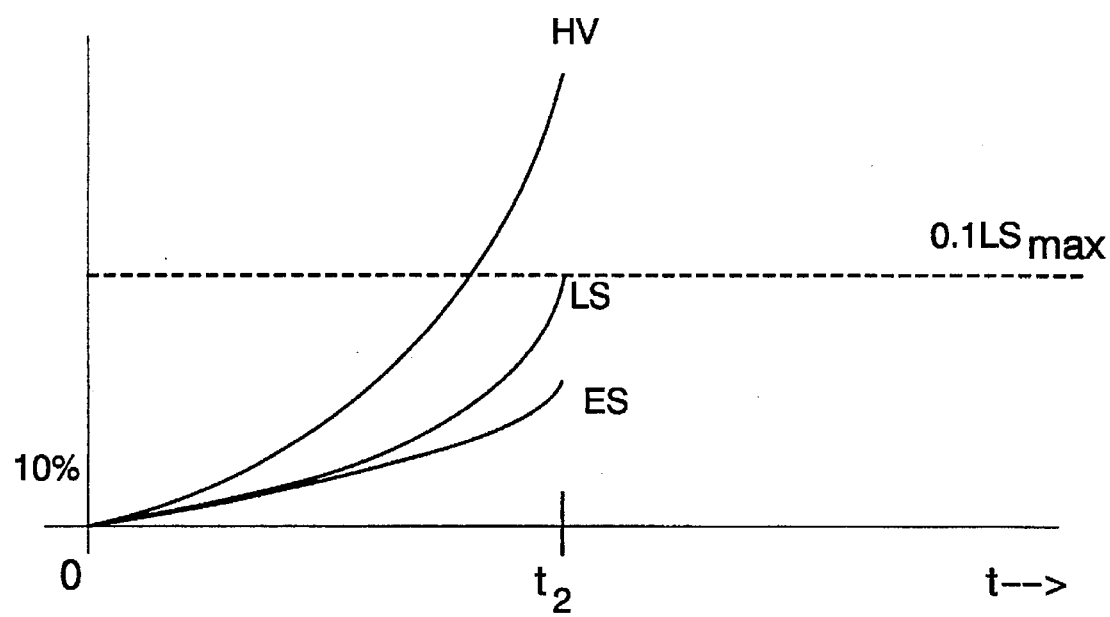
Figure 14:
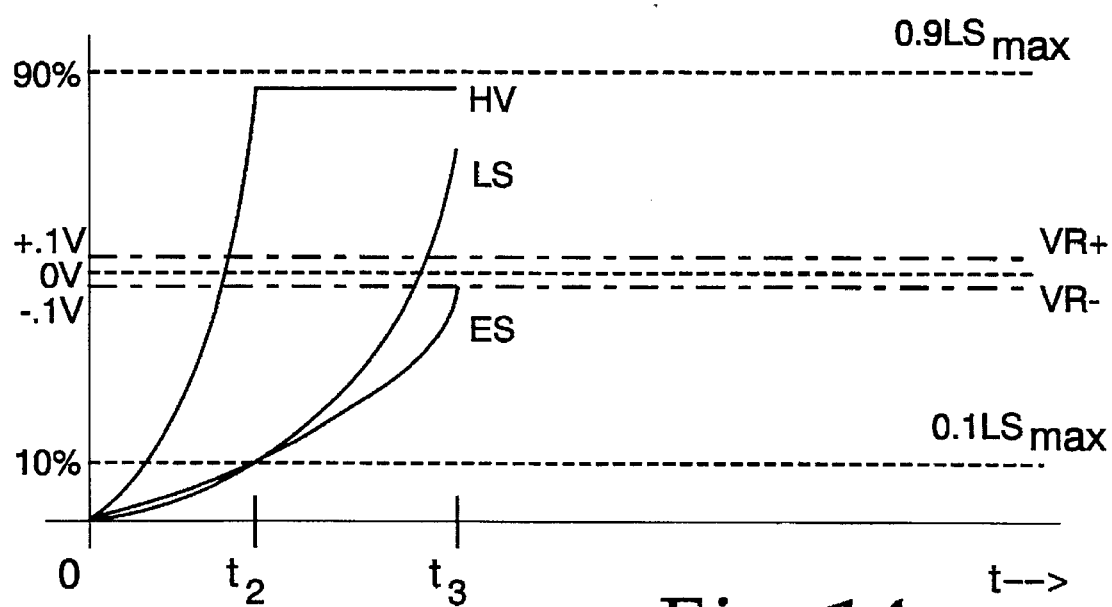

Referring now to FIG. 13, the input signals HV and LS and the output signal ES continue to rise. At time $t_2$ the Error Signal ES lies below the desired band of operation. However, at time $t_2$ Level Shift signal LS achieves 10% of its maximum value and on a subsequent iteration through to the flow chart of FIG. 21, the electronic controller software finds that decision block 806 is satisfied, and (after testing positive in block 830) control is transferred to block 804 which ramps (or otherwise increases) Level Signal LS in block 804. Control is then passed to block 816 which holds the high voltage input signal HV constant (as indicated in FIG. 14). The Level Shift signal LS and high voltage signal HV are combined in block 810 and the resulting moisture value is outputted according to block 812, with control being transferred to the start point for a successive iteration.

Figure 15:
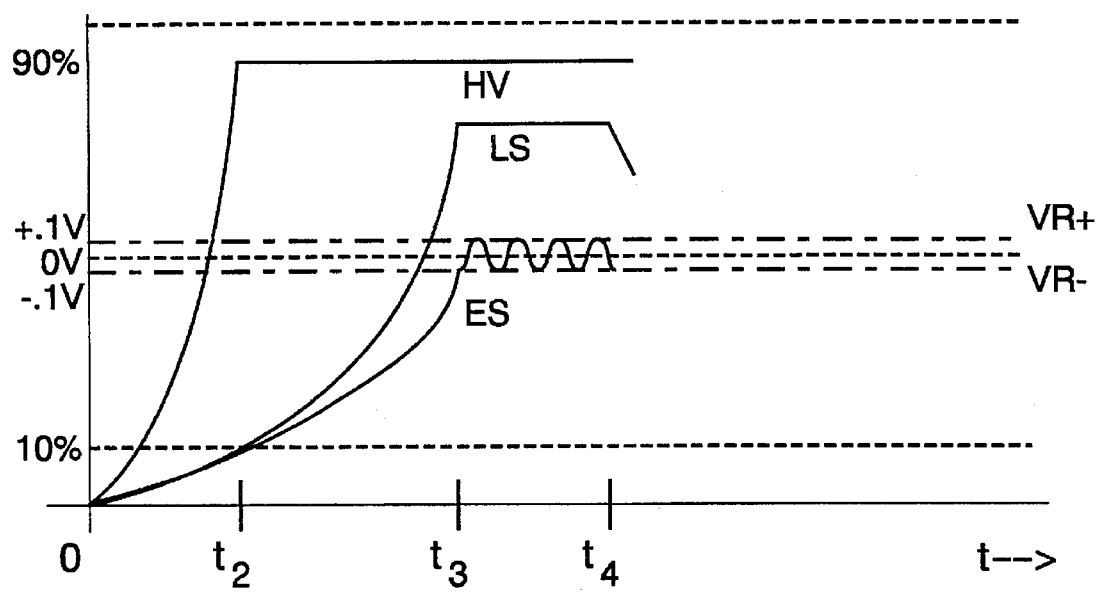

Referring now to FIG. 14, between times $t_2$ and $t_3$, the error signal lies below the desired band of operation and accordingly the Level Shift signal LS is ramped in a positive direction according to control block 804. Since the Level Shift signal exceeds 10% of its maximum value, the high voltage signal HV is held constant according to control block 816 of FIG. 21. At time $t_3$, the Error Signal ES reaches the level of $VR^-$, the lower limit of the desired band of operation. Accordingly, decision block 802 is satisfied and control is transferred to blocks 818, 838 which hold the Level Shift signal LS constant (as indicated in FIG. 15).

As the moisture level at the surface of the web varies, the Error Signal ES also varies accordingly. FIG. 15 illustrates an operating condition where the surface moisture varies cyclically, within the desired operating band, causing the Error Signal ES to also lie within a desired band of operation (that is, between the levels $VR^+$ and $VR^-$). During this period of operation, the decision block 802 is satisfied, and accordingly, the Level Shift signal LS and High Voltage signal HV are held constant.

Figure 16:
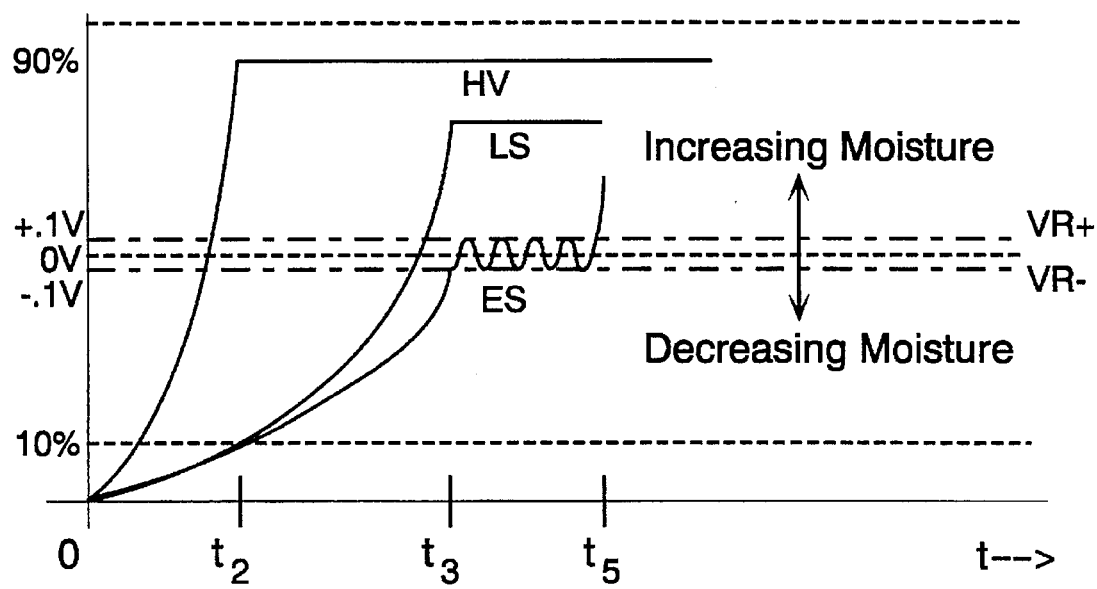
Figure 17:
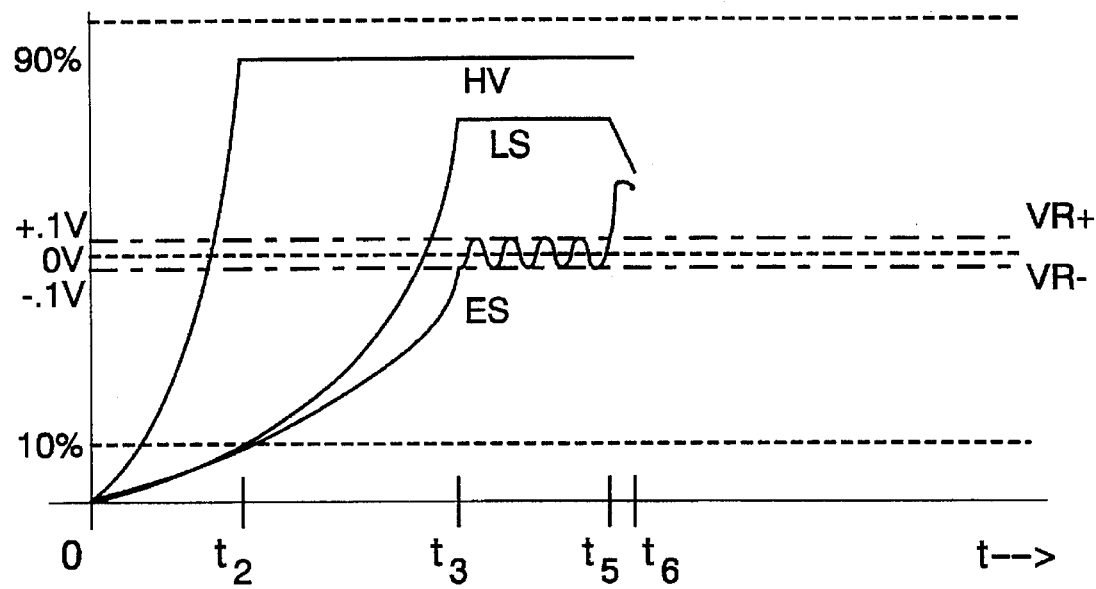

Referring now to FIG. 16, at time $t_5$, surface moisture of the web increases substantially, with the Error Signal ES rising above the upper limit $VR^+$ of the desired band of operation. Accordingly, the decision block 802 is not satisfied, and control is passed to the right hand side of the decision block, which detects that the Error Signal ES exceeds the upper limit of the desired band of operation $VR^+$. The Level Shift signal LS is between 10% and 90% of its maximum value, and accordingly, the decision blocks 824, 832 are satisfied. Control is then transferred to block 822 which calls for the input signal LS to be ramped in a negative direction, as indicated between times $t_5$ and $t_6$ in FIG. 17. After passing control to block 816 (which holds the High Voltage input signal HV constant, as indicated in FIG. 17), control is passed to block 810 which combines the Level Shift signal LS and High Voltage signal HV. These values are combined and the resulting moisture value is outputted according to block 812.

Figure 18:
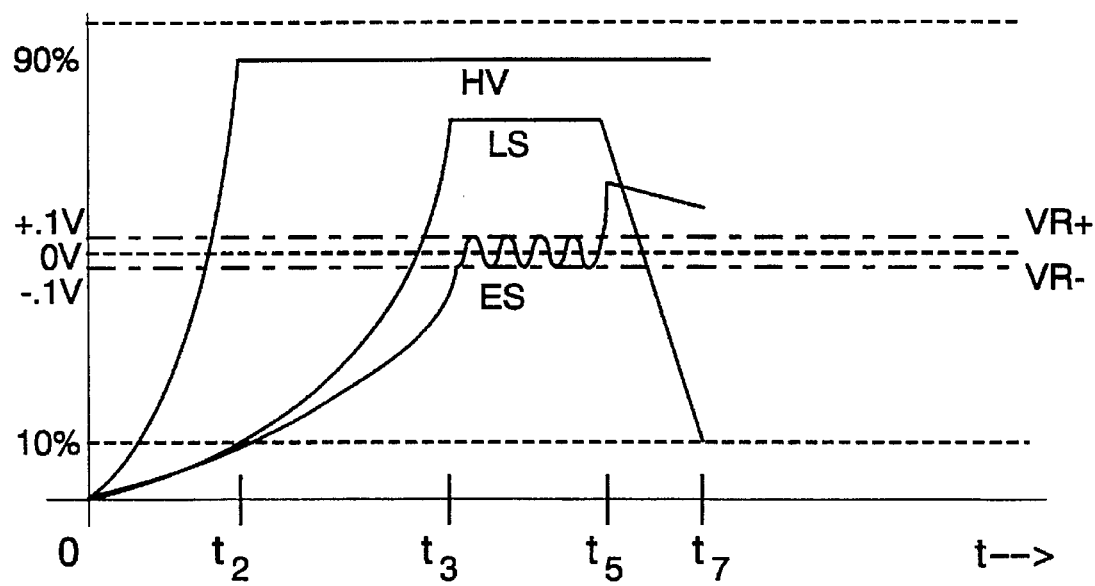

Referring now to FIG. 18, a somewhat unusual operating condition is represented, in which the surface moisture value of the board is so high that a full range of control of Level Shift signal LS is not sufficient to bring the Error Signal ES within the desired band of operation. As indicated in FIG. 18, the Level Shift signal continues to be ramped (and/or nonlinearly reduced) in a negative direction under control of block 822. At time $t_7$, the Level Shift signal reaches the 10% threshold.

On the next iteration, block 802 remains unsatisfied, with control being transferred to block 832. Unlike previous iterations, block 832 tests negative, indicating that major loop control is needed to bring the Level Shift signal LS within the desired operating boundary (i.e., between 90% and 10% of the maximum LS value). The decision block 802 has found that the Error Signal ES is lower than its desired operating range and block 832 has found that the Level Shift signal LS, i.e., the input to the minor loop control, has been unable to correct the error signal level (i.e., has been unable to bring the Error Signal ES within the desired operating range between $VR^+$ and $VR^-$). This condition is accordingly interpreted as requiring major loop control and a command is given by block 834 to ramp (or otherwise reduce) the major loop input (i.e., the signal HV) in a negative direction. This results in a lower voltage being applied to the sensor elements, causing a lower test current to flow between the elements, thus decreasing the Error Signal ES.

In the preferred embodiment, as mentioned, the High Voltage signal HV and the Level Shift signal LS both have the same nominal operating range, i.e., between 0 and 10 volts. It is preferred, however, that the major loop control (that part of the electronic circuit coupled to the input terminal HV CONTROL) provide a more sensitive response than the minor loop of the electronic circuit (that part of electronic circuit 730 coupled to the input terminal LEVEL SHIFT). Accordingly, the major control loop portion of electronic circuit 730 (which acts in response to the input signal HV) is made more responsive than the minor control loop portion of electronic circuit 730 (that portion which responds to input signal LS).

Under these conditions, block 834 causes the High Voltage input signal HV to decrease, preferably at a linear rate (i.e., is "ramped"), or less preferably at a nonlinear rate. This will cause the Error Signal ES to quickly drop, and will eventually cause the Level Shift signal LS to also drop. Control is then transferred to block 810 which combines the Level Shift signal and High Voltage signals LS and HV and their resulting output is passed on by control block 812.

On a subsequent iteration of the control loop, if decision block 802 is unsatisfied, but the decision block 832 is satisfied, thus indicating that the Level Shift signal has climbed above the 10% boundary, then control is passed to block 822 and the Level Shift signal LS is ramped in a positive direction, while control block 816 holds the High Voltage signal HV constant. Again, the moisture value is obtained by combining LS and HV under operation of control block 810 and the resulting value is outputted under control of block 812.

Figure 19:
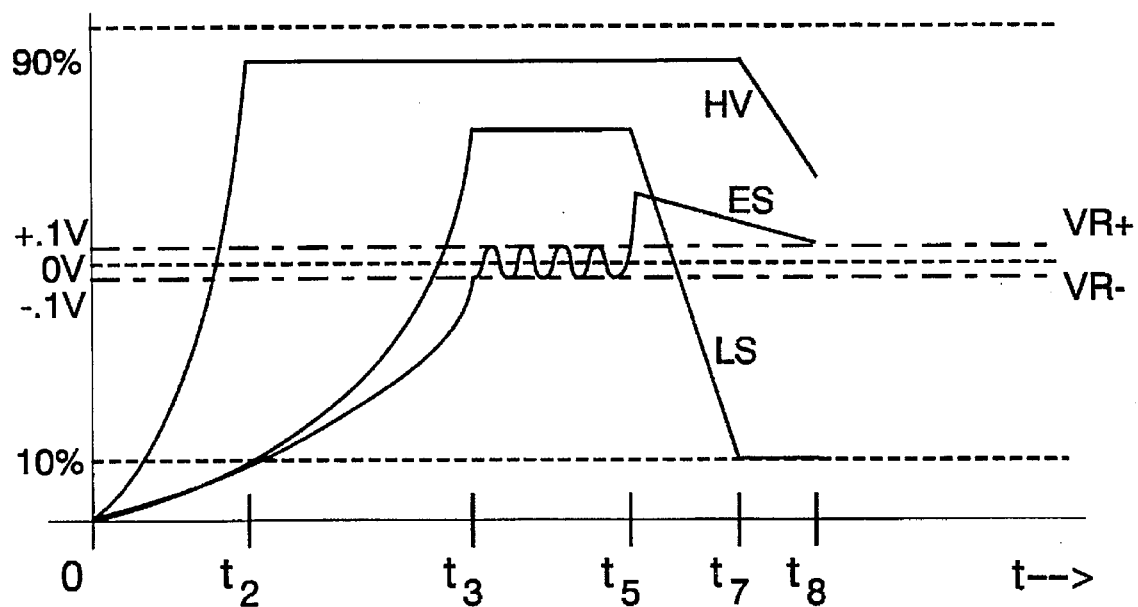
Figure 20:
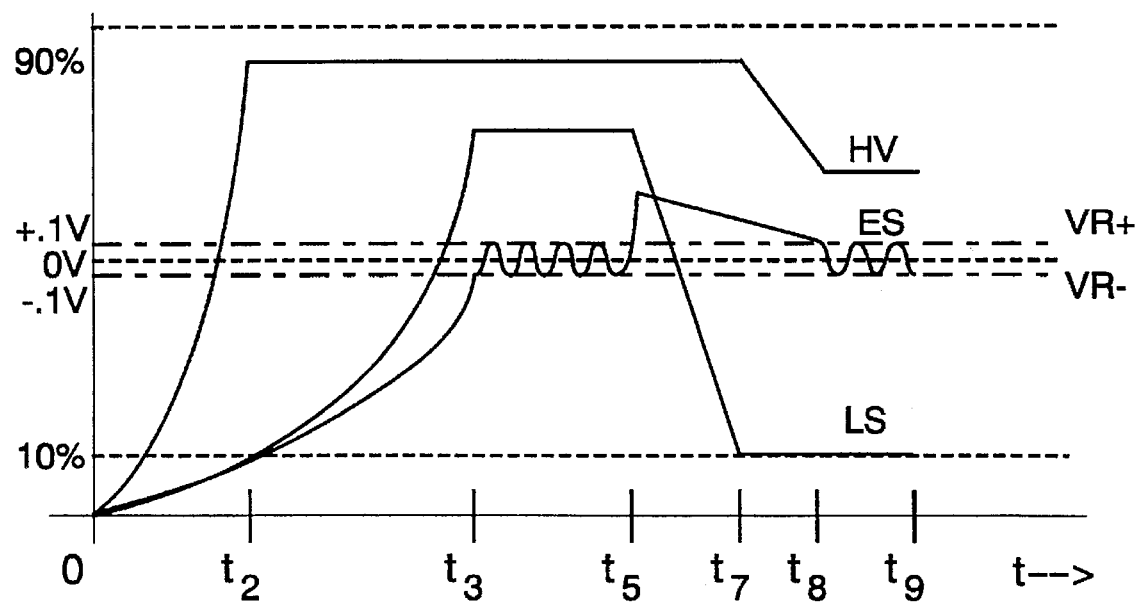

Referring now to FIG. 19, at time $t_8$, the error signal reaches the upper boundary $VR^+$ of its preferred operating range, under control of the downwardly sloping High Voltage signal HV. Accordingly, decision block 802 will be satisfied and control blocks 818 and 838 will hold the Level Shift signal LS and High Voltage signal HV constant, as indicated in FIG. 20.

Referring again to FIG. 21, the portions of the flow diagram in the right hand and left hand branches of decision block 802 are preferably made mirror images of one another. Referring briefly to the right hand branch of control block 802, the Error Signal ES is found to be greater than the upper boundary limit $VR^+$ and tests are made in blocks 824, 832 to determine if the Level Shift signal LS lies within its desired operating range. If either of the decision blocks 824 or 832 tests negative, the need for major loop control is indicated, and accordingly, in control block 834 the High Voltage signal HV is ramped in a negative direction.

Figure 28:
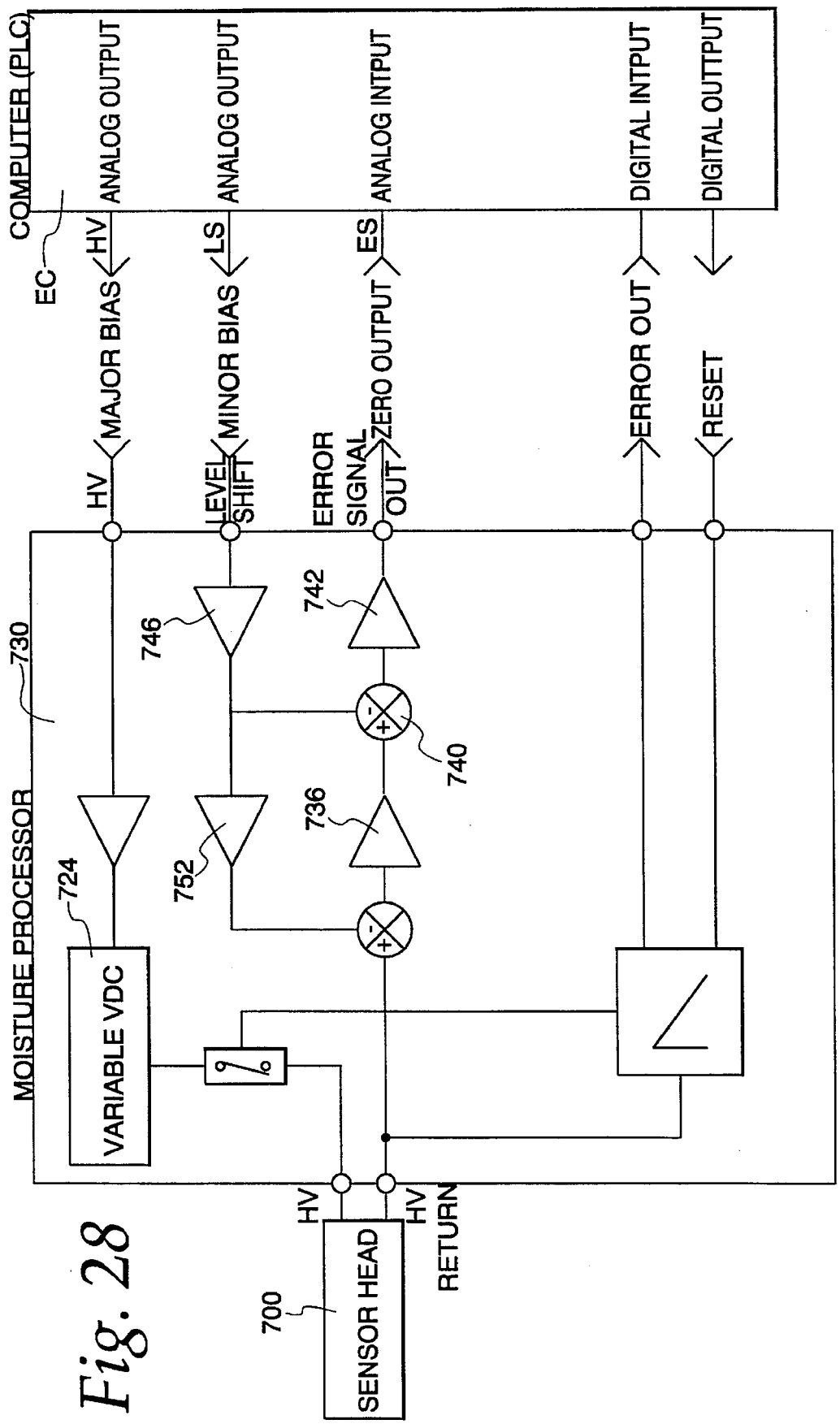
FIG. 28 is a block diagram of the electronic circuit of FIG. 22.

As seen above, the electronic circuit 730 and its associated computer control, as shown in FIGS. 21 and 28, for example, provides information which is used to control wrap arm position of various web heaters. It has been found in the production of paperboard products, as described herein, that absolute moisture values are not required, and that relative moisture values will suffice. However, it will be appreciated by those skilled in the art that the high voltage moisture sensors, electronic circuit 730 and computer control described above, are capable of outputting data directly related to absolute moisture values. Since the data outputted from block 812 does provide a direct indication of moisture values, conventional calibration techniques could be relied upon to provide absolute moisture values. For example, data can be collected from control block 812 over a desired operating range. The absolute moisture levels of the web could be detected over the same operating range by conventional moisture sensing equipment and a look-up table correlating values outputted from control block 812 to empirically determined absolute moisture values could be created. In a control block following control block 812, the value outputted in control block 812 would be compared to values in the empirically determined look-up table and an absolute moisture value could be outputted, if desired.

Preconditioning Heater Operation

Figure 10A:
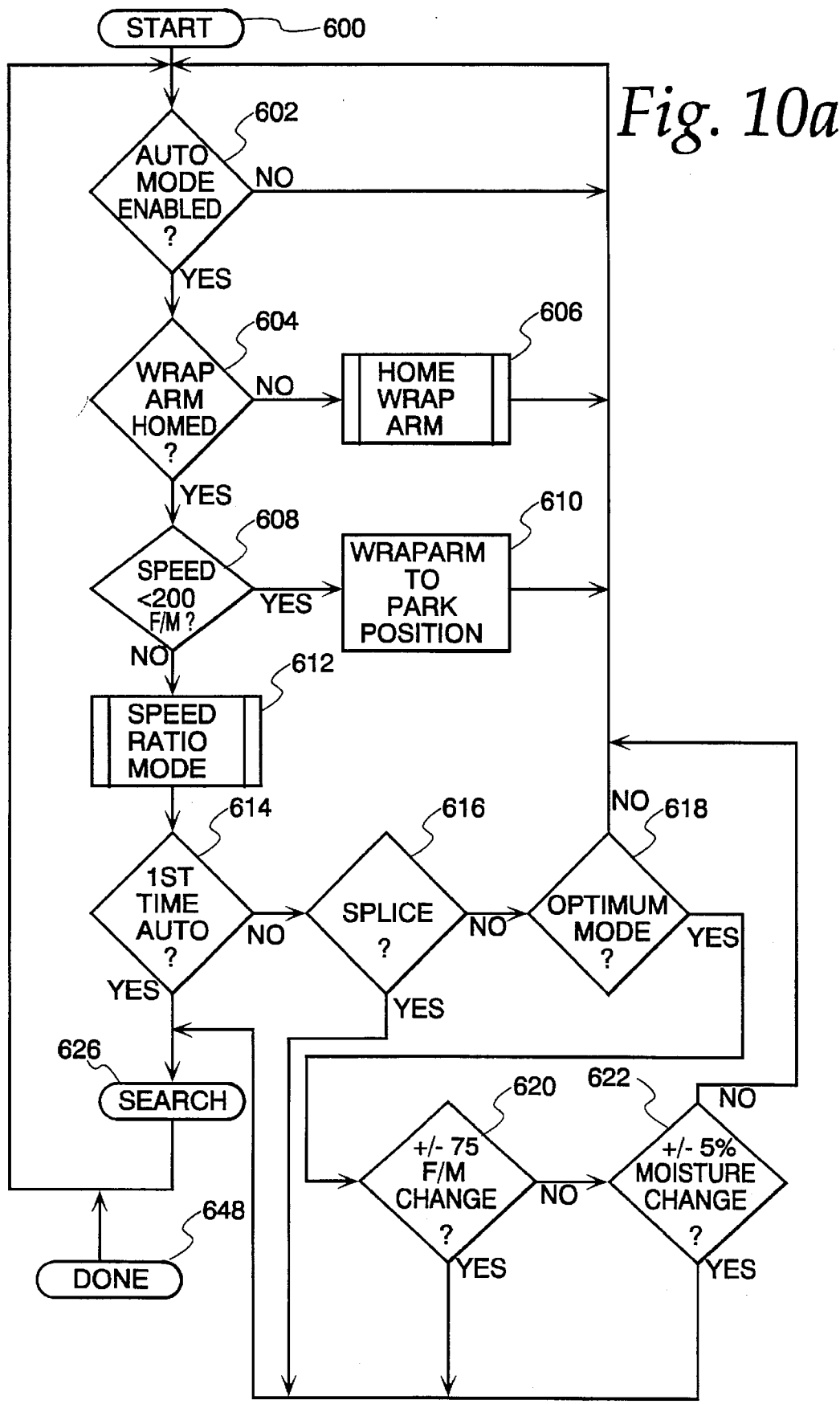
FIGS. 10a and 10b together comprise a flow chart indicating control of the heating means of FIG. 7.
Figure 10B:
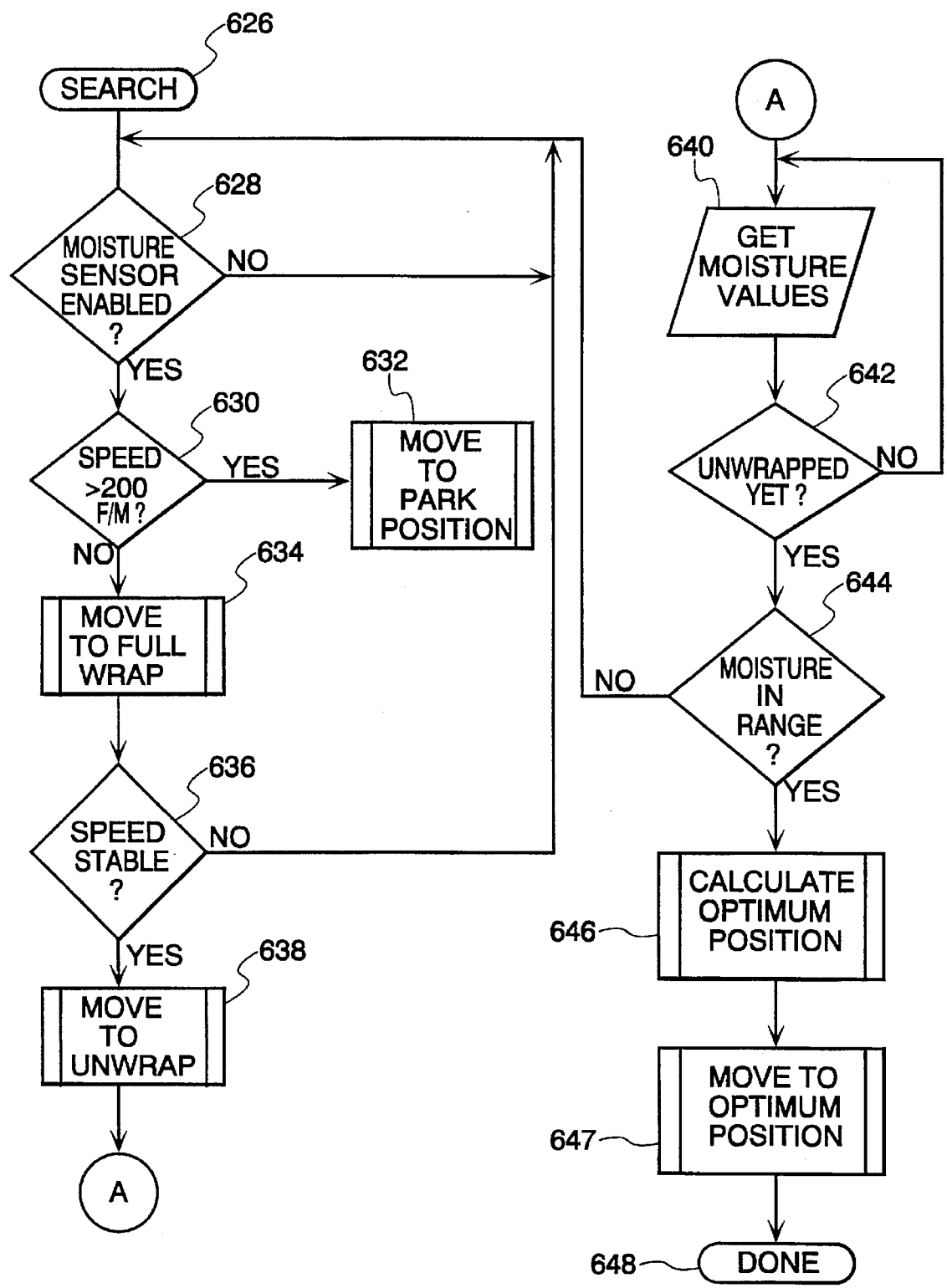

Referring now to FIGS. 10a and 10b, operation of the preconditioning heater 42 will be described. As will be seen herein, the methodology of control is similar to that previously described for the heater 24, with the exception of the calculation of optimum position, which has already been described with reference to FIGS. 7 and 8.

As mentioned, operation of manufacturing apparatus 5 is begun with loading the rolled webs 36, and threading the webs through the system, as illustrated in FIG. 1, for example. The heaters and optional showers are brought up to operating temperatures and pressures in preparation for a production run, indicated in FIG. 9a by block 600. Next, as indicated in decision element 602, query is made as to whether an automatic operating mode is enabled. Generally speaking, this contemplates two automatic control modes, the first focusing on the optimum positioning of wrap arm 40, and the second relating to the speed of web 31 past heater 42, as will be seen herein.

If the automatic mode is not enabled, the electronic controller EC continues to poll the system to determine if the automatic mode has been updated. With the automatic mode enabled, control is transferred to decision block 604 which tests whether the wrap arm 40 is homed to the minimum position 372 in FIG. 7. If necessary, block 606 energizes the drive system (not shown) for wrap arm 40 to move it to the desired angular position. Next, a test is conducted in decision block 608 to determine if a minimum critical web speed is maintained in the machine, and, if not, block 610 moves wrap arm 40 to minimum position 372 (see FIG. 7).

Control is then transferred to block 612, directed to a secondary control of manufacturing apparatus 5. Under control of block 612, the speed of web 31, controlled by control system 69, is monitored for ongoing changes during system operation. Basically, control block 612 calls for greater wrap as web speed increases, and lesser wrap as web speed decreases. It should be recognized that the wrap arm 40 can be manually positioned by an operator with or without assistance from system instrumentation. A control block 612 would perform web speed-related adjustments to such manual wrap arm positioning if the auto mode is enabled (see block 602).

Control is then transferred to block 614 which tests whether the automatic mode was previously initiated. If not, a test is made in block 616 as to whether a splice has been made in web 11. If a splice has been made, the control system assumes that a recalibration is necessary. Control block 618 tests whether an optimum wrap arm operation has previously been achieved, and if not, control is transferred to the beginning of the control loop, at block 602. If an optimum mode has been previously achieved, a test is made in block 620 as to whether the web speed has experienced an unacceptable perturbation, and if not, a test is made in block 622 to see whether an unacceptable perturbation in moisture has occurred. Block 620 tests whether a relatively small change in web speed has occurred. If a change is below a preset threshold amount, then control block 612 is allowed to proceed with a ratio control of the wrap arm position, directly related to the web speed. If, however, block 620 detects an acceptably large change in speed, then control block 612 is, in effect, relieved of further control, until a new operating point has been determined by a search routine indicated in block 626.

Referring now to FIG. 9b, a search initiated in block 626 transfers control to block 628 which tests whether the moisture sensor 45 is operational. Assuming the moisture sensor has been successfully verified, a test is made in block 620 to determine whether a minimum critical web speed has been achieved, and if not, the wrap arm is moved to the minimum position 372 illustrated in FIG. 5. With a minimum critical machine speed verified, control is transferred to block 624 which begins a data collection cycle, moving the wrap arm 40 to the minimum position 370 illustrated in FIG. 7. A test is made in block 636 to verify that web speed is sufficiently stable, that accurate test results will be obtained. Assuming such verification is obtained, control is then transferred to block 638 which moves wrap arm 40 from the unwrapped or minimum position 372 to the full wrapped position 370.

In control block 640, moisture data is collected as wrap arm 40 is moved throughout its operational range of motion, and a representative example of the data obtained in control block 640 is illustrated in FIG. 6. As indicated by block 642, data collection continues until the wrap arm 40 is moved to its end point (fully wrapped maximum position 370). Block 644 tests whether the observed moisture values lie within a reasonable range, the physical interpretation of which is a quick pass-fail decision as to whether the paper is (for some unusual reason) too wet or too dry.

Assuming the pass-fail test is satisfactorily performed, control is transferred to block 646 which calculates the optimum wrap arm position $\phi_3$, using the technique described above with reference to FIG. 8. Wrap arm 40 is then moved by control block 648 to the optimum wrap arm position $\phi_3$. Block 646 then stores a value in memory indicating that optimum mode has been achieved and this data is eventually tested in decision block 618. As indicated at the bottom of FIG. 9a, control is then transferred to the top of the automatic control procedure, with the test then being performed by decision block 602.

As mentioned, the optimum wrap arm position has been achieved, and is subsequently adjusted, if necessary, in control block 612, in response to a change in web speed, using a "ratio" or other direct mathematical relation between web speed and wrap arm position change. Decision block 614 will test false, requiring further testing in decision blocks 616–622 to be performed, thus monitoring as to whether unusual perturbations in web speed or moisture change have occurred since the wrap arm was set to an optimum position. If necessary, recalculation and determination of an updated optimum wrap arm position will be required, with control being transferred to block 626.

The controls described above with reference to FIG. 2 are also employed in the double-backer system described above with reference to FIGS. 3a and 3b. More specifically, the controls described above with reference to FIG. 1 are identically employed for the double-backer inner board 131 and double-backer outer board 153 of FIG. 3a. Further, these same controls are employed for the bonding of liner 121 to the double-backer inner board 131.

From the foregoing, it will be appreciated that the invention provides a novel and improved corrugation system. The invention is not limited to the particular embodiment described above or to any particular embodiment. In particular, the above-mentioned "electronic controller" may be, but is not limited to being, an electronic or otherwise automated controller, a processor, a computer or a logical operator. Also, the above-mentioned "board" may be, but is not limited to, board made of paper or other pulpy material.

Terms such as "horizontal," "vertical," etc. are used herein only to describe the orientation of the various components relative to one another, when the invention is in an upright position as shown in the drawings. It should be understood that the invention may be operated in various different orientations, and the use of these terms is not intended to imply otherwise, nor to limit the description or claims to an invention disposed in a particular orientation.

What is claimed is:

1. A method for preparing a paper web for adhesive joinder, comprising the steps of:

providing a paper web having first and second opposed major surfaces and containing moisture;

providing heating means with a curved outer heated surface;

providing a wrap arm for wrapping the paper web across the heating means, with the wrap arm movable between first and second positions so as to bring greater and lesser portions of the paper web in contact with the heating means;

moving the wrap arm between said first and said second positions so as to bring a changing amount of the first surface of the paper web in contact with the heating means;

providing a probe means having electrically conductive probe elements for contacting the paper web. at the first surface;

applying a voltage to the probe elements to create a test current flowing through the web;

sensing, for the different positions of the wrap arm, the surface moisture carried by the paper web at the first surface by measuring the test current;

sensing, for the different positions of the wrap arm, the temperature of the paper web at the first surface;

determining a low temperature wrap arm position at which a rate of increase of surface moisture increases;

determining a high temperature wrap arm position at which a rate of increase of surface temperature is negligible;

determining an offset comprising the difference between the low temperature wrap arm position and the high temperature wrap arm position;

determining a high moisture wrap arm position at which a rate of increase of surface moisture is negligible;

determining a desired operating position of the wrap arm by adjusting the high moisture wrap arm position toward the low temperature wrap arm position by an amount corresponding to the offset; and moving the wrap arm to the desired operating position.

2. The method of claim 1 wherein the wrap arm is moved continuously between said first and said second positions.

3. The method of claim 1 wherein the wrap arm is moved from a first position of greater wrap to a second position of lesser wrap.

4. The method of claim 1 wherein the second major surface of the paper web contacts the heated surface and the surface moisture of the paper web is sensed at the first major surface of the paper web.

5. The method of claim 1 further comprising the steps of:

conveying the paper web across the heated surface;

observing the speed of the paper web across the heated surface; and adjusting the wrap arm according to the speed of the paper web.

6. The method of claim 5 further wherein the step of adjusting the wrap arm according to the speed of the paper web comprises the step of moving the wrap arm toward the high temperature wrap arm position as the speed of the paper web increases.

7. The method of claim 5 wherein the step of adjusting the wrap arm according to the speed of the paper web comprises the step of moving the wrap arm toward the low temperature wrap arm position as the speed of the paper web decreases.

8. The method of claim 1 wherein the step of applying a voltage to the probe elements to create a test current flowing through the web includes varying the voltage to the probe elements in response to a voltage control signal.

9. The method of claim 8 wherein the step of measuring the test current flowing through the web comprises creating a test signal proportional to the test current, creating a level signal to null the test signal, measuring the level signal and the voltage control signal, and combining the level signal and the voltage control signal to obtain a resulting signal which is proportional to the surface moisture carried by the paper web.

\* \* \* \* \*